United States Patent [19]

Harris et al.

[11] Patent Number: 5,050,071

[45] Date of Patent: Sep. 17, 1991

[54] TEXT RETRIEVAL METHOD FOR TEXTS CREATED BY EXTERNAL APPLICATION PROGRAMS

[76] Inventors: Edward S. Harris, 2726 Van Hise Ave., Madison, Wis. 53705; Paul Kleinberger, 4 Hamaapilim Street, Jerusalem, 92545; Natan Blanks, Emek Hashoshanim 21/6, Ness Tiona 70400, both of Israel; Richard B. Kraus, 35 Sycamore Ct., Lawrenceville, N.J. 08648; Thomas R. Wolfe, 5110 Minocqua Crescent, Madison, Wis. 53705

[21] Appl. No.: 267,011

[22] Filed: Nov. 4, 1988

[51] Int. Cl.[5] ............................................ G06F 15/401
[52] U.S. Cl. .............................. 364/200; 364/282.4; 364/282.1; 364/283.1
[58] Field of Search ..................... 364/200, 300, 900

[56] References Cited

U.S. PATENT DOCUMENTS 4,425,629  1/1984  Cason et al. ........................ 364/900
4,760,526  7/1988  Takeda et al. ...................... 364/300

Primary Examiner—David Y. Eng
Assistant Examiner—Robert B. Harrell
Attorney, Agent, or Firm—Quarles & Brady

[57] ABSTRACT

A computer program for the storage and retrieval to information texts is provided the ability to access and retrieve external text files created by other application programs. The program stores information as texts and creates a summary text associated with each external text file. Keywords associated with the external text can then be indexed to the summary text so that a keyword search of the information texts can use the summary text. If a search leads to the summary text, the user can use a hot link to immediately launch the external program to access the external text file.

3 Claims, 15 Drawing Sheets

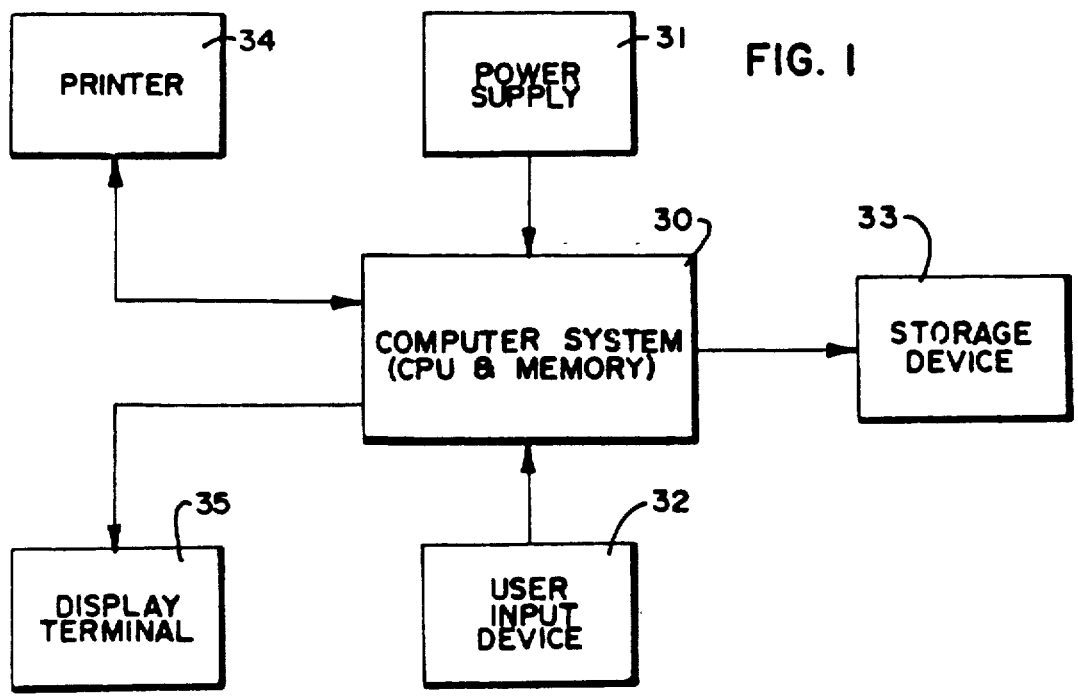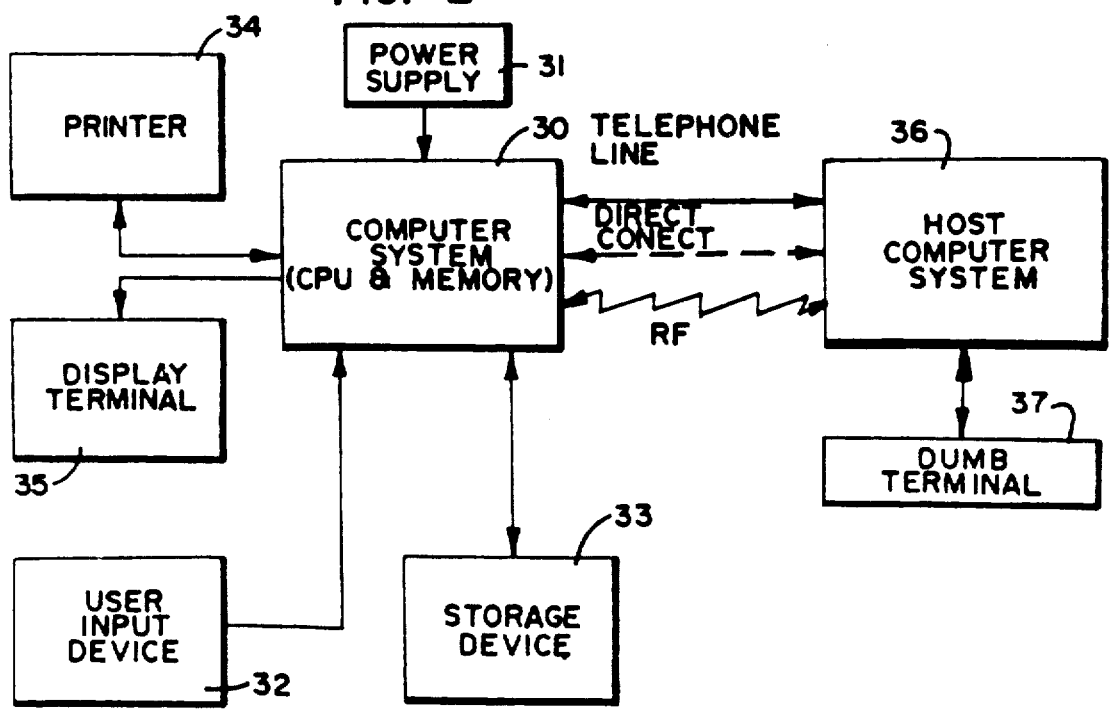

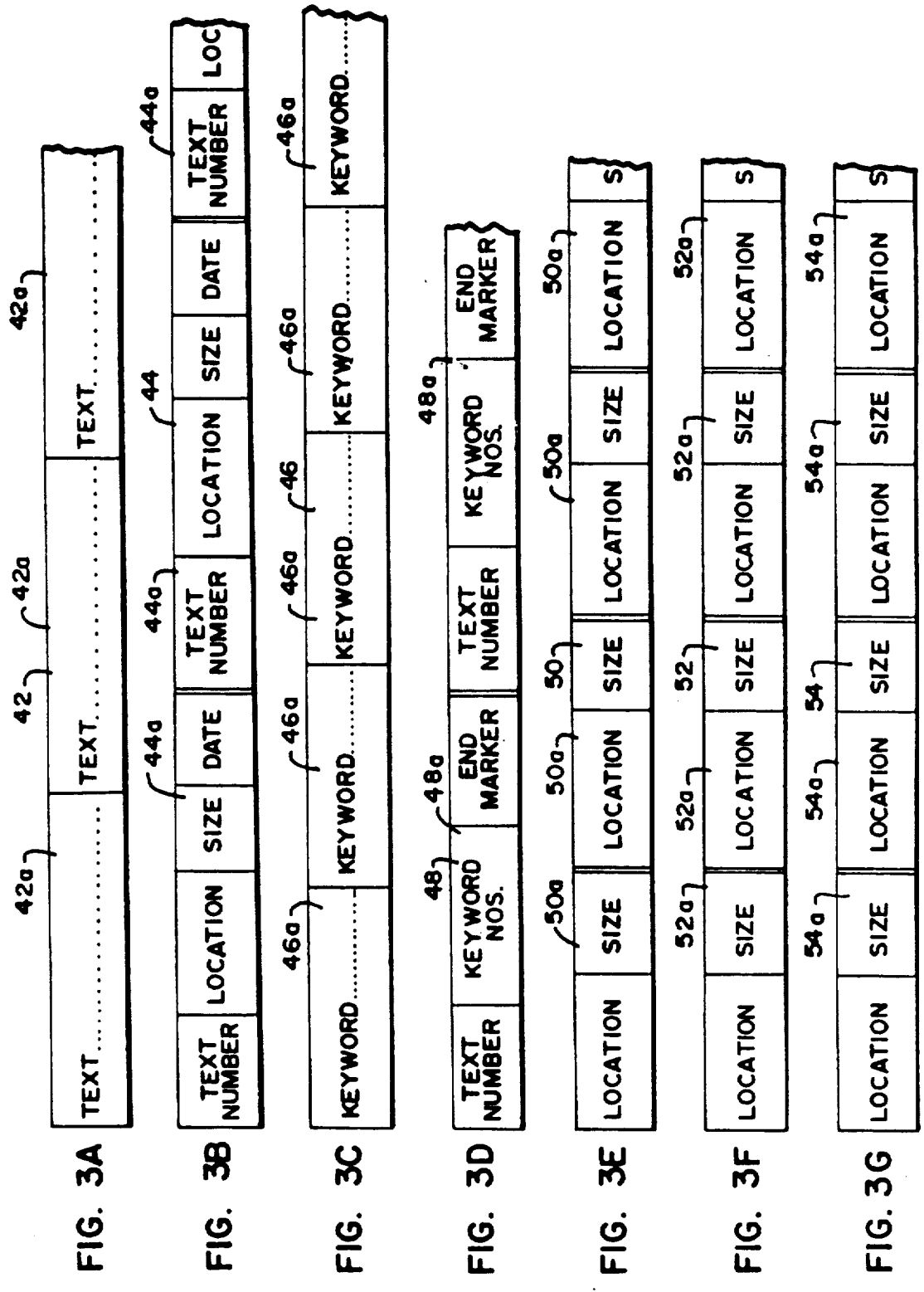

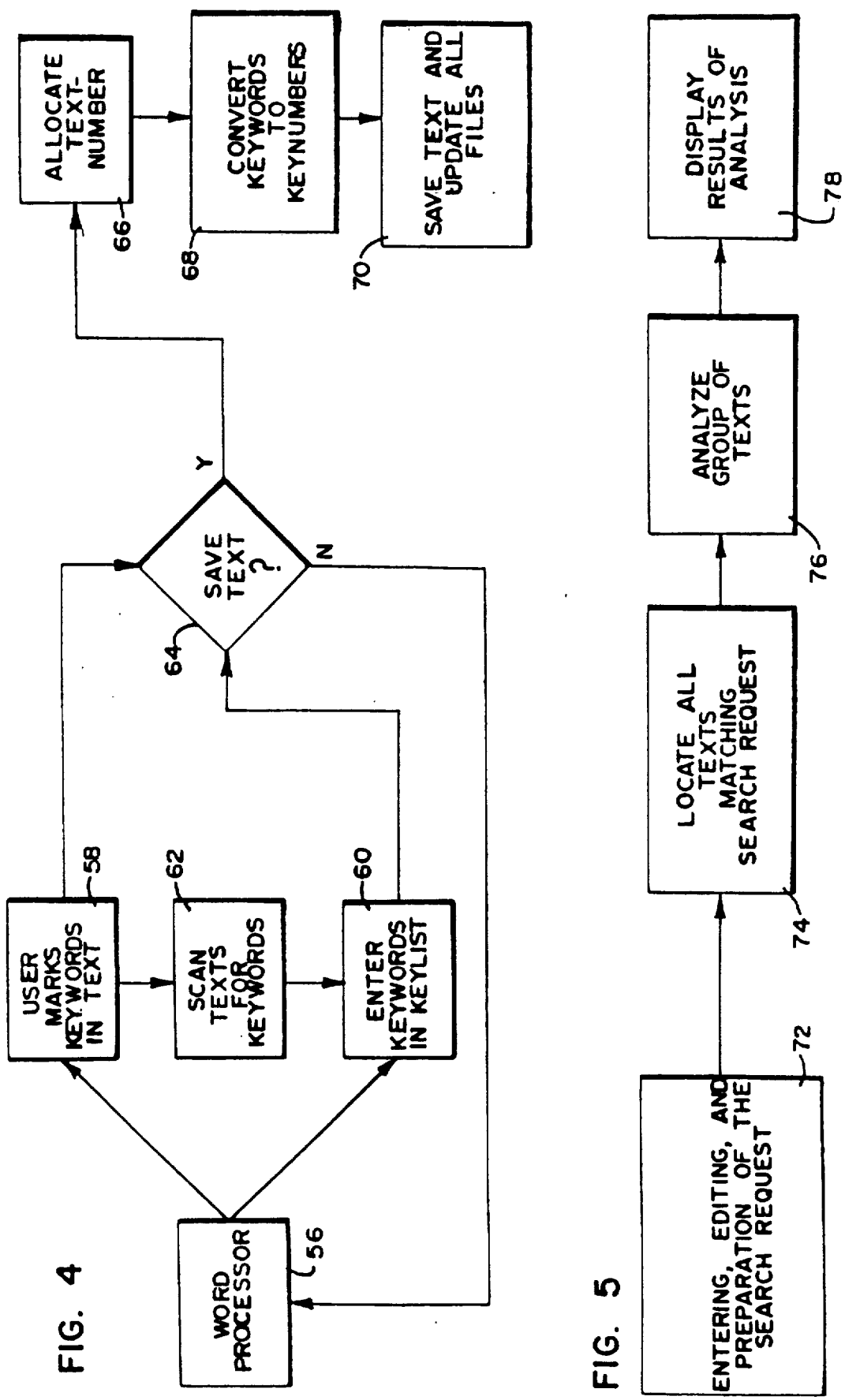

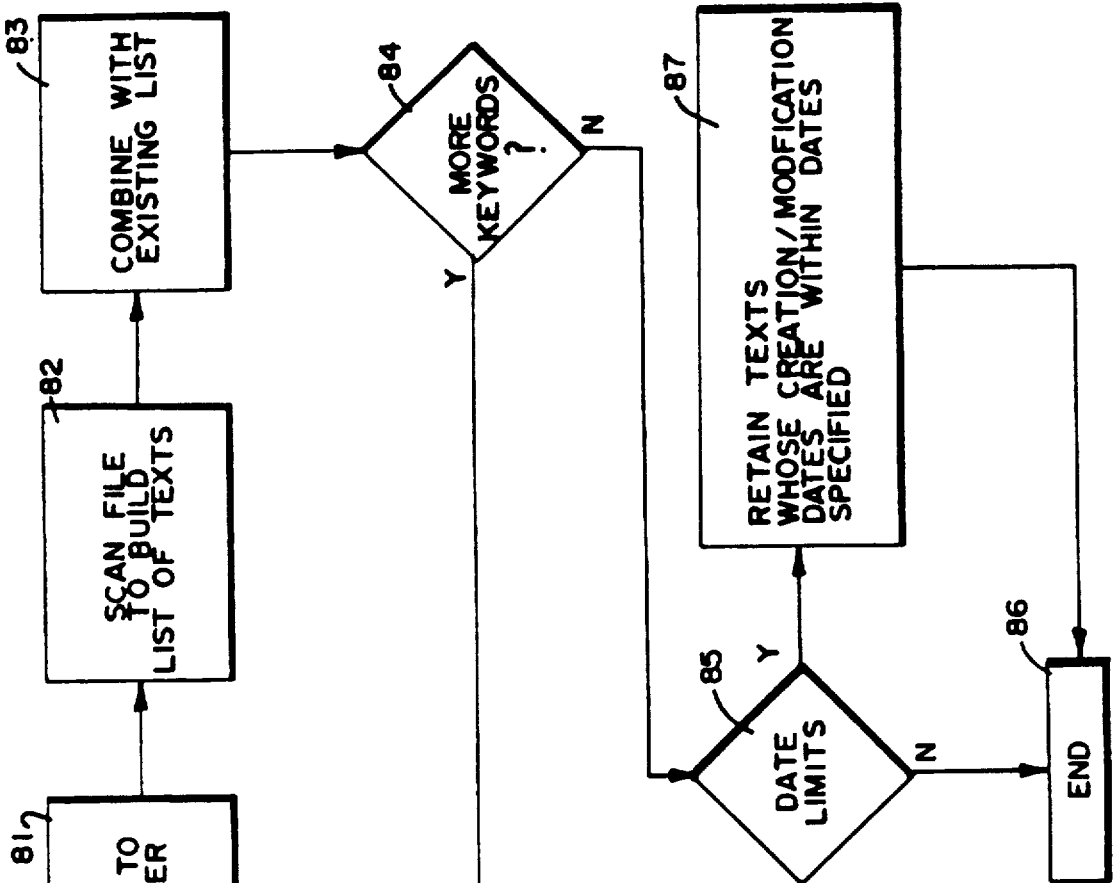

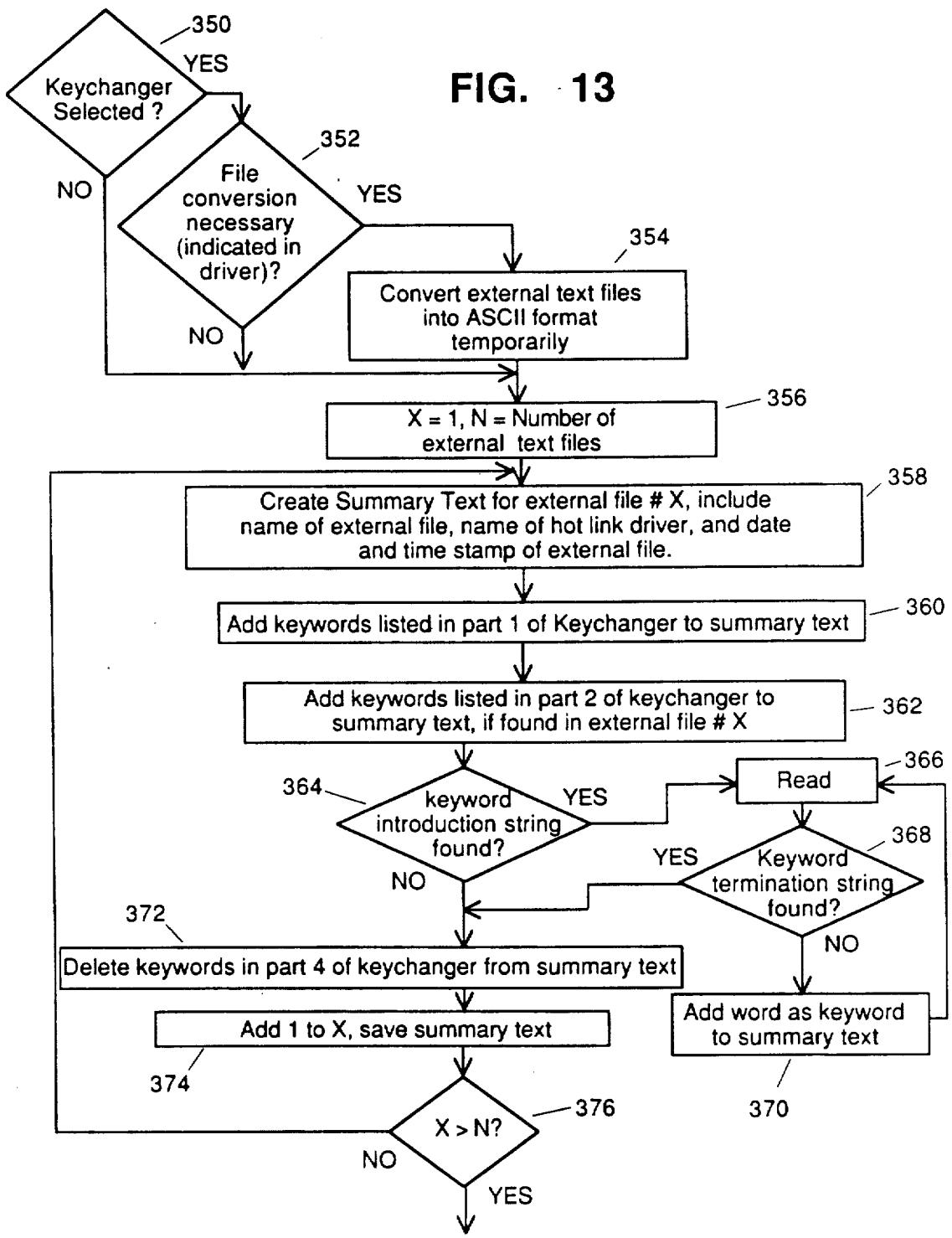

FIG. 14

```
Press F1 for help, F10 for other functions

Creator Program: Quattro
External File:   C:\quattro\timemgt.wkq
Mark keyword in file: Ctrl-K    Edit keyword list in file: Ctrl-L Access external file ♦

◄This is the budget for the time management study proposal developed with
Lewis and Moriarty for the Department of Education. Dated: August, 1987

INSERT
Pg 1  Ln 7  Col 23    Text modified 12:10 pm, 20 Oct 1988 | 12:11 pm, 20 Oct 1988
F1Help F2Save F3Release F4Keywrd F5New F6NxtLnk F7Brwse F8Bktrk F9Search F10Menu
```

TEXT RETRIEVAL METHOD FOR TEXTS CREATED BY EXTERNAL APPLICATION PROGRAMS

FIELD OF THE INVENTION

The present invention relates to the technology of computerized information storage and retrieval in general, and relates, in particular, to a computer software program capable of storing and retrieving information contained in text files and documents created by other computer software programs, and then dynamically linking to the other program for retrieval and modification of the textual information and documents.

BACKGROUND OF THE INVENTION

The present invention relates to the general field of information storage and retrieval. Information storage and retrieval refers to the process of generating and storing specific items of information and then selecting and presenting data retrieved from those specific items. As used herein, text information storage and retrieval refers to the creation and retrieval of potentially large, irregular, and heterogeneous collections of texts from a collection, or text base, according to a user's variable descriptions of the subjects for which they are interested in information retrieval. A "text base" information retrieval system is one that is based on a large number of "texts" which can be miscellaneous strings of information, sentences, or documents, of indeterminate and varied length, and of a wide variety of data classes, including words, numbers, values, and graphical information.

Some information retrieval systems which are based on retrieval of word information index all words appearing in all of the texts. Others index "keywords" which are descriptive words assigned to certain texts by the text's author or by a key word assignor. The keyword often, though not always, is a word which appears in the text itself. A user who wants to find a particular text does so by asking for a search for texts associated with a particular keyword or by using a logical (Boolean) combination of keywords as a tool for information retrieval. Often such systems may also allow for the user to search among information in the text base by character string or other user-modifiable search strategy.

A typical search request on prior art information storage and retrieval systems generates a long list or a large collection of texts which logically satisfy the search criteria imposed by the user. Typically in such a situation, the user is searching for a single or few texts, and is attempting to intelligently guess at the appropriate logical combination to use to identify and retrieve the texts in which the user is interested with the fewest number of extraneous files being included. Thus the user must often spend much time and energy examining pertubations of search strategy to try to pick out those texts or files which are truly relevant to the user's needs.

A system has been proposed for the analysis of text bases based on a keyword-type system which then analyzes the keywords of the texts which are retrieved, and presents the information derived from those keywords in a software-generated pseudo-intelligent outline-type display for the user. This system of presentation of keyword-derived information to the user allows the user to more quickly and easily window through a search strategy to find the item or items in which the person is interested. Such a system is described in International PCT Published Application number WO88/04454 by Paul Kleinberger published June 16, 1988, the specification of which is hereby incorporated by reference.

The system described in this published patent application by Kleinberger is extremely efficient and effective for the retrieval and analysis of information which has been entered by the user into the program generating text base organized by the user. In common day usage of personal computers, however, much textual information will be available within the files or storage of the personal computer which has been generated in, or through the use of, other software application programs. The information retrieval system and method as described above by Kleinberger is not inherently capable of abstracting and retrieving information contained in text files generated by other software application programs.

There are known to be some types of computer software application programs for personal computers which are capable of starting or "launching" other diverse software application programs, and then recovering control of the computer when the launched program is finished. For example, the operating system for the Macintosh personal computer sold by the Apple Computer Corporation is known as the "Finder." Using the "Finder" operating system, a user is presented with a visual display of files to which access may be obtained through the Finder, and the user may select an icon from the visual display created by the Finder program to launch an application program. When the user quits from the launched application program, the Finder program automatically reasserts control over the machine and reinstitutes operation, thereby recreating the visual display for the user created by the operating system. The Finder program does not, however, maintain detailed information, other than file name and location and other attributes necessary to launch the application, about the internal data contained within the application programs that it launches.

Another application program, also available on the Apple Macintosh, is capable of providing linkages between different application programs This application program, known as "Hypercard," allows the creation of certain linkages between different program files. Each linkage is custom constructed by the user to automatically proceed to link to a certain point in another application program and, upon return, to return to the point from which the application was launched Again, this program contains no inherent ability to conduct searches for information contained in files generated by other application programs or to selectively launch into certain files based on the results of such searches.

SUMMARY OF THE INVENTION

The present invention is summarized in that an information storage and retrieval system is constructed to maintain information about keywords in text documents and text files created by separate external application programs so that the keywords stored may be used in a keyword-based information retrieval system in the same fashion as are the text documents generated by the first application program. Thus, using the first application program, it is possible to search for and analyze by keyword text files both contained within the application program and also files external to the first application program in an equal manner. If a search using the first application program leads to a document text file external to the application program, the application program is capable of terminating and remaining partially resident while the second external application program is launched to give access to the user to the data or file in which the desired information has been found. Upon termination of the second application program, control of the processing stream returns to the first application program so that other searches or other information retrieval can be conducted.

It is thus an object of the present invention to provide a comprehensive information management and retrieval system, capable of using a wide variety of application programs through a single master data storage and retrieval application program.

It is thus a feature of the present invention that the master, or first, application program is capable of launching any of a various number of other application programs to gain access to and retrieve the data stored or administered therein.

It is yet another object of the present invention to provide an information storage and retrieval system which is capable of terminating and remaining resident during operations of other application programs in the same computer so that keyword and other information necessary for information retrieval can be stored from the second application program for insertion into the master, or first, information storage and retrieval application program.

Other objects, advantages, and features will become apparent from the following specification when taken in conjunction with the accompanying drawings.

BRIEF DESCRIPTION OF THE DRAWINGS

FIG. 1 is a schematic diagram of the elements of a personal computer in which the method of the present invention might be implemented.

FIG. 2 is a schematic view of the elements of a computer terminal and remote host system in which the method of the present invention might also be implemented.

FIGS. 3A to 3G are schematic views illustrating file structures of a computer software implementation of the method of the present invention.

FIG. 4 is a schematic flow chart illustrating a method of adding texts to the text base in the file structure of FIGS. 3A to 3G.

FIG. 5 is a schematic flow chart illustrating a method of retrieving and analyzing texts from such a text base.

FIG. 6 is a schematic flow chart illustrating a method of scanning texts in a text base in a keyword-based search.

FIG. 9 is a view illustrating a sample screen display created by the method of FIGS. 5-8A and 8B.

FIG. 13 is a schematic flow chart of a method of selecting or creating keychangers.

FIG. 14 is a view illustrating a sample screen display of a summary document display in accordance with the present invention.

DETAILED DESCRIPTION OF A PREFERRED EMBODIMENT

Figure 7:
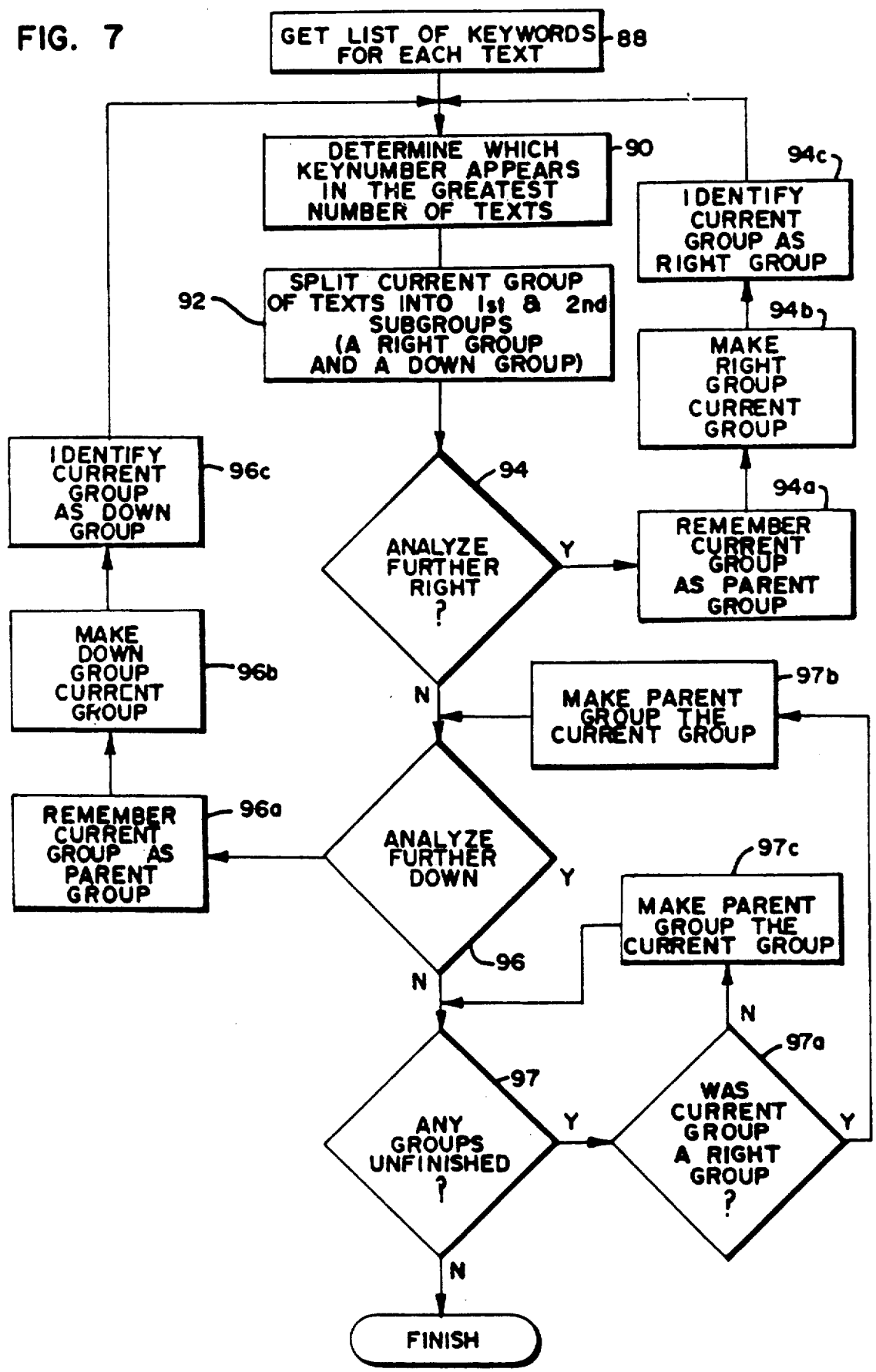
FIG. 7 is a schematic flow chart of a method of analyzing and grouping texts found in a search.

The present invention is best embodied in a computer program for a personal computer. The particular version described herein is implemented in the C language for an IBM-PC or compatible personal computer, but it is to be understood that the same technique is equally functional using other languages and other types or classes of computers.

The method of the present invention is based, in part, on a criterion key text retrieval, search, analysis and presentation scheme which is also disclosed in published PCT patent application WO 88/04454, published June 16, 1988, the specification of which is hereby incorporated by reference. The method of the present invention is thus best understood in the context of this criterion key text retrieval system, and the method disclosed here extends such a system to index and retrieve text in files created by other distinct software application programs, such as word processors, spreadsheets or others. To best understand this extension, it is first necessary to understand the basic file structure and method of text searching and retrieval within such a criteria key text base storage and retrieval system, and then to describe how the system is extended to handle and retrieve files created by other programs.

As generally illustrated in FIGS. 1 and 2, the program is in principle easily transportable to a large family of micro, mini, and main-frame computers, and can be used in a multi-user environment. For example, as illustrated in FIG. 1, the program is loaded into the memory of a computer system 30 powered by a suitable power supply 31. The computer system 30 will include a user input device 32 such as a keyboard and/or mouse. In addition, the computer system will preferably include a storage device 33 for storage of text material. A printer 34 will be provided for hard copy printout of results and a display terminal 35 will be provided for display for the program analysis at the display terminal. As illustrated in FIG. 2, the computer system 30 might be interconnected to a host computer system 36 by any number of different methods such as by telephone lines, a direct connect via a serial interface cable, or a radio frequency (FR) interconnection. The program of the present invention might be utilized in the computer system 30 and/or the host computer 36. In a multiuser environment, the program might be utilized from a dumb terminal 37 interconnected to the host computer 36.

FILE STRUCTURE

The file structure of a program for storage and retrieval of data within files created by this program will now be described.

As illustrated in FIGS. 3A-G, the textual information itself and the indexing information necessary to access it are kept in seven data files.

A text file 42 contains variable-size records 42a of the texts which have been saved in the textbase, there being a record for each text in the textbase. This information is ordinarily all kept in one file, though the possibility exists of splitting it into several smaller files if the physical limitations of the computer system being used prevent a single file of large enough size being maintained.

A text pointer file 44 contains information as to where each individual text is located within the text file 42 itself. Space in the text file 42 is allocated as it becomes available (by old texts being deleted or updated); an ordered list is therefore necessary in order to locate the desired text at any time. Each record 44a of the text pointer file 44 includes a Text Number field assigning a unique number to each of the texts, a Location field specifying the text location, a Size field specifying the size of the text, and a Date field for providing information as to the date each text was last modified, for use when searching for texts which meet specific date criteria.

A keyword file 46 contains variable-size records 46a listing every keyword which has been defined in the textbase. The keywords may have been defined in several different ways; for example, the author may define the keywords as the text is entered, the keywords may be defined automatically through the use of an automatic keywording feature as described below, text down-loaded from a commercial data base may have keywords already predefined, etc. A keynumber is allocated to each keyword on the basis of its position in the keyword file 46.

An index of which texts contain which keywords is kept in text keyword file 48. This file contains a variable-size record 48a for each text in the textbase, the entries being in the form of the number of the text being referred to, followed by a list of the keynumbers of the keywords associated with that text, followed by an end marker to indicate the end of that list and then the entry for the next text.

A text index file 50 includes a record 50a for each text providing an index to the location and size of the entry in the text keyword file 48 for each text.

Free key file 52 and free text file 54 are lists of available space in files 48 and 42, respectively, so that space in those files can be reused as texts are deleted or updated. The files 52 and 54 and their associated records 52a,54a have a structure similar to that of the text index file 50.

ADDING TEXTS TO THE TEXTBASE

FIG. 4 illustrates the process by which texts are created and saved in the textbase. Texts might be created at 56 by a word processor function associated with the program of the present invention, or by "importing" texts from files which have been created by other programs, such as by other word processor programs or texts developed from a data base search request. The user defines the keywords which he wants to use to describe that text, either by marking them in the text itself at 58 or by entering the keywords in a separate keyword list at 60. Keywords which the user has marked in the text are automatically scanned at 62 and added to the keyword list; both the test itself and the keyword list are available for editing throughout this process.

The same process is used to modify keywords defined in a text which has previously been saved in the textbase; the text is retrieved from the textbase in the normal manner (see below), and is then available for editing in the word processor.

When the user has finished entering or modifying the text, he enters a command; e.g., presses a key, to save it at 64. A number is allocated to the text at 66, based on the next available position in the text pointer file 44. The keyword list for the text is then converted to keynumbers at 68, either by finding the existing keyword in the keyword file 46 or by adding a new keyword to the file 46. The position of a keyword in the keyword file 46 corresponds to the keyword number assigned to that keyword. The text itself, together with its keyword list, is added to the text file 42 and the textnumber and list of keynumbers added to the text-keyword file 48. The index and text files 44, 50, 52, and 54 are then updated with the appropriate information.

In the case of saving a text which previously existed in the textbase the process remains substantially the same; it is saved using its previous textnumber rather than allocating a new number, and the old information on keywords which describe that text is deleted from the text keyword file 48 and replaced with the new information.

SEARCHING THE TEXTBASE

Figure 8A:
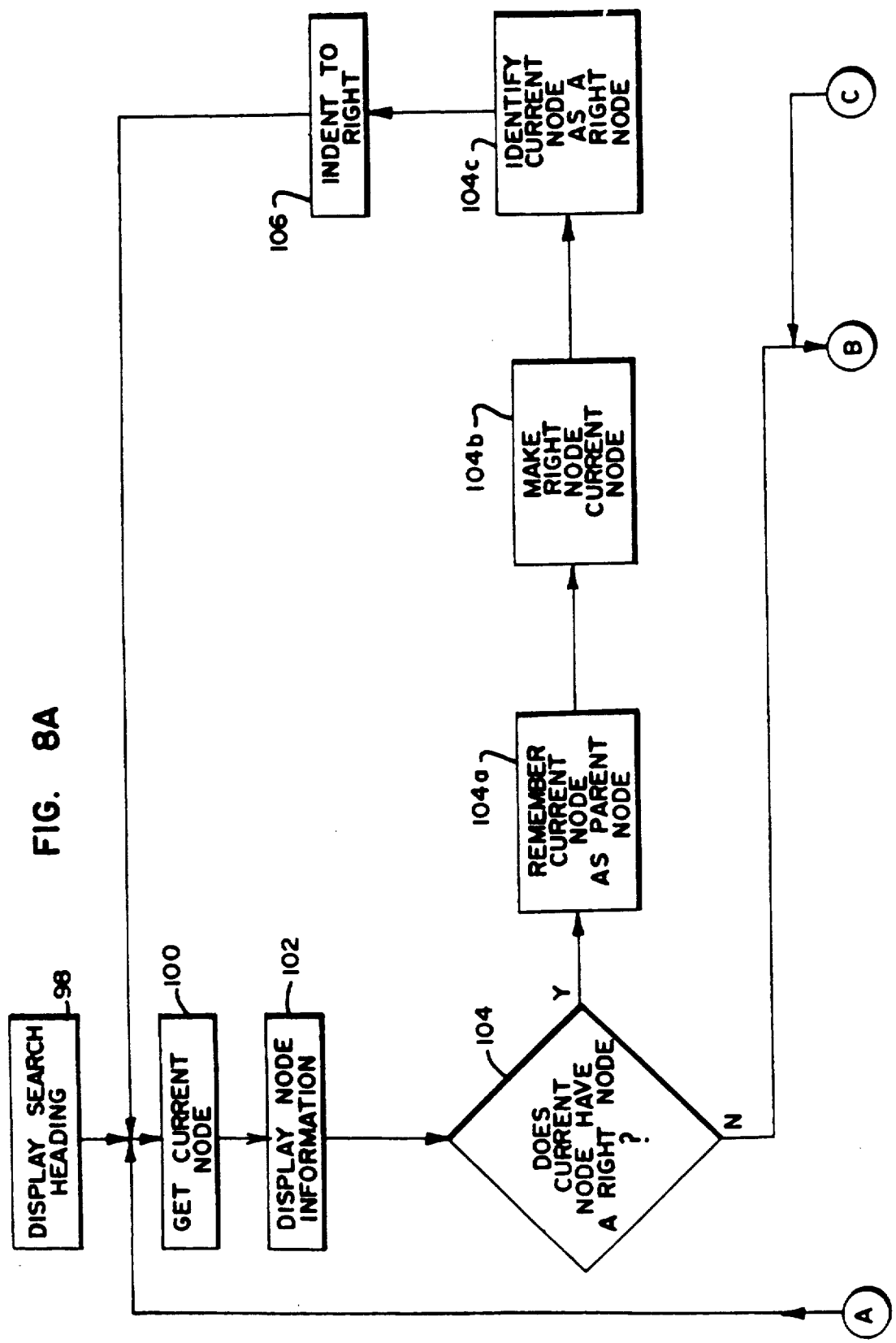
FIG. 8A and 8B are a schematic flow chart of a method of organizing a presentation of grouped texts to a user.
Figure 8B:
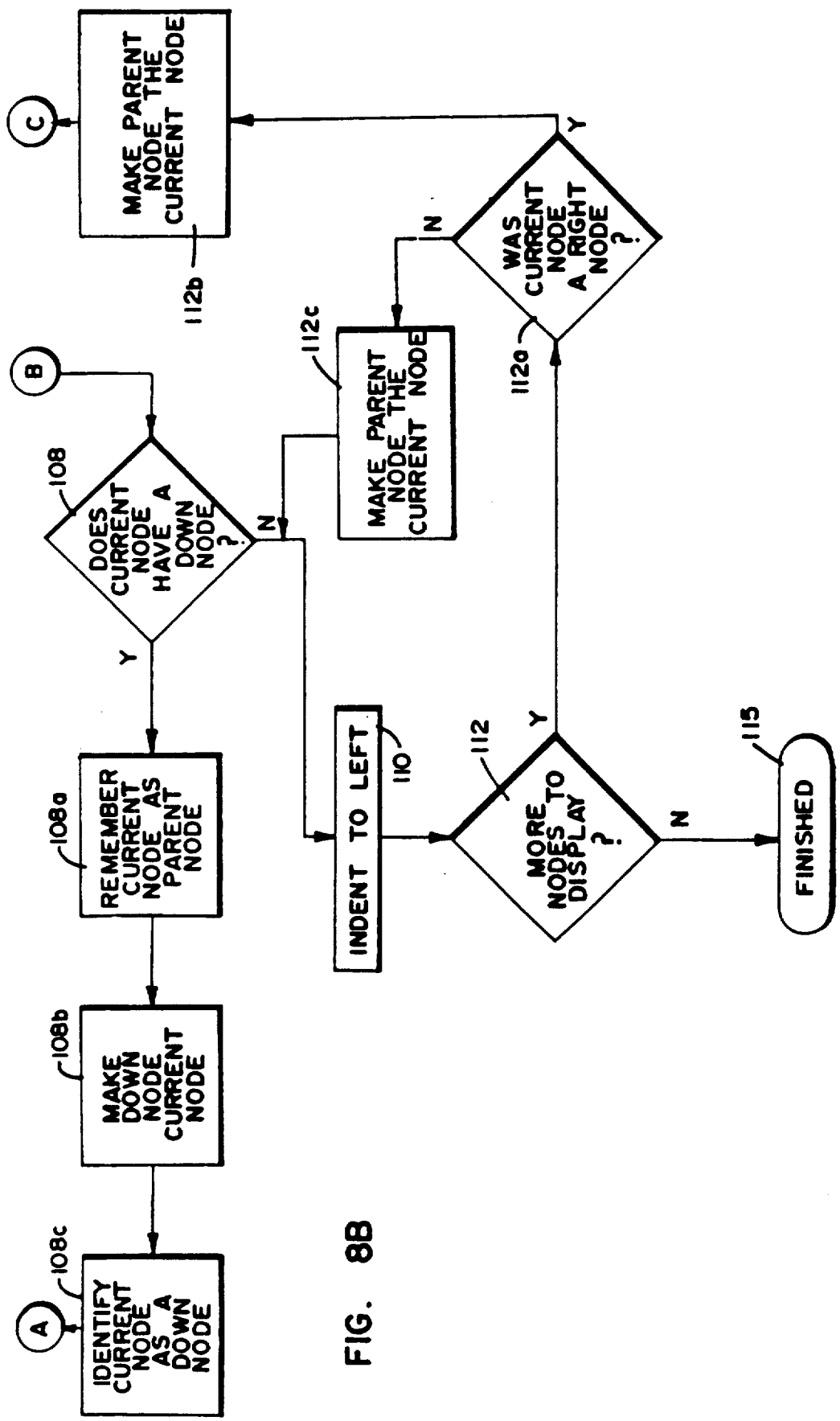
Figure 10:
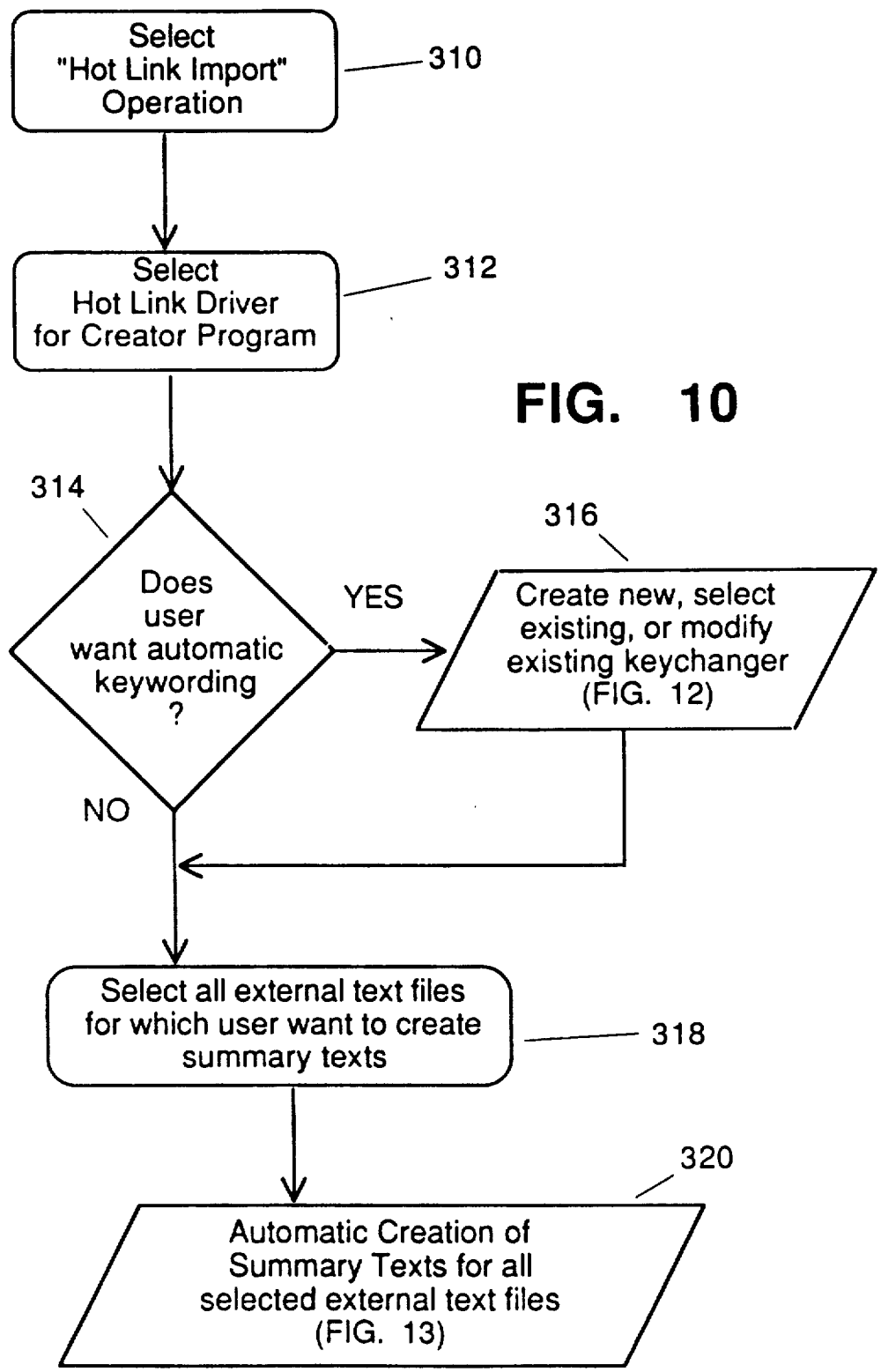
FIG. 10 is a schematic flow chart of a method of performing a hot link import of information about an external text file.

The procedure by which the user searches the textbase to find a particular text or texts is illustrated in FIG. 5. The user initially enters his search request at 72, in the form of the keyword or keywords which describe the information he is looking for. Boolean combinations or keywords may be used in the description to logically describe the set of texts which is being searched for. If the user has asked that similar words or pre-defined "equivalent" words be substituted into his search request, the substitution is made at this time. (This process is described below and in FIGS. 12 through 14.) The program then searches the textbase at 74 to locate all texts which match the search request, as is shown in further detail in FIG. 6. At 76, the program analyzes the set of texts which are found to satisfy the search request as shown in FIGS. 7 and 10, and at 78, the program displays the results of this analysis at the user's display terminal (screen) as shown in FIG. 8.

As illustrated in FIG. 6, texts are selected by scanning the text-keyword file 48 for each keyword in the search request, and building a list of the texts which match the request. This list is constructed by taking from the search request each keyword in turn at 80, looking up its keynumber at 81 in the keyword file 46, and then scanning the text-keyword file 48 to find all texts which contain that keynumber at 82. The numbers of the texts are added to the list as they are found at 82. This list is then combined at 83 with the list of texts which had been found by previous iterations of this process, which dealt with keywords mentioned in earlier parts of the keyword request. The lists are combined according to the logical operation specified by the user. At 84, the process is repeated, the list produced by each successive iteration being combined with the list created by all previous iterations, until all the keywords in the search request have been dealt with. At 85, the program checks if the user has requested that the search be limited to texts created (or modified) within certain date limits. If the user has imposed no such date limits, at 86 the text selection is terminated. If the user has requested date limits, at 87 the listed texts are checked against dates stored in the text pointer file 44 and only those texts whose creation/modification dates fall within the limits are retained.

The program then analyzes the set of texts which has been found and presents the results of that analysis. The process by which the analysis is carried out, and the manner in which the results are presented, will now be described.

ANALYZING THE TEXTS FOUND IN THE SEARCH

The program analyzes the set of texts which has been found to match the initial search request, by means of the process shown in FIG. 7. First, at 88 the program obtains the list of keynumbers associated with each text in the set. These lists are obtained by reading them from the text-keyword file 48. The lists for each text are then scanned at 90 and the number of texts in which each keynumber occurs is counted in order to identify the "criterion key"—the most frequently occurring keynumber, i.e., the keyword which is associated with the greatest number of texts in that set.

The set of texts is then divided into two subsets at 92; the "right-group" containing all texts which are described by the "criterion key," and the "down-group" containing those texts which are not described by the criterion key. The "right-group" is thus a list of all the texts in the current set which include among their keywords the "criterion key;" all remaining texts from the current set are listed in the "down-group."

As will now be described, these two subsets are then in turn analyzed by the same process of finding the most commonly occurring keynumber and using it to split the set of texts; the two sections of the program at 90 and 92 being performed recursively until all the texts have been analyzed, or until such time as a decision is reached not to continue analysis further in either the "right" or the "down" direction.

If at 94, a decision is made to continue the analysis further in the "right" direction, then note is taken at 94a of the identity of the current group, as it will be the "parent" group for the forthcoming recursive iteration of the process. Then at 94b, the sub-group which had been the "right-group" created at 92 is marked as the new upcoming "current" group, and note is taken at 94c that it was originally created as a "right-group" at 92. The analysis routines now invoke themselves recursively; that is, handling of the previous current group (now the parent group) is interrupted and the system begins the analysis of the new current group at 90. The full analysis is thus a set of nested processes; for a group of text to be fully analyzed, the analyzing routines first split the initial group into two sub-groups, and then invoked themselves to handle the further analysis of each of the resulting sub-groups. Thus, the process proceeding to handle the new current group at 90 and at 92 may again be interrupted at 94 to handle yet another right group produced at 92 during this second iteration, and/or at 96 to handle analysis of the "down-group" produced at 92 during this second iteration. The procedure, if the iteration is interrupted at 96, is similar to that described above at 94a, 94b, and 94c: note is taken at 96a of the identity of the current group, which will be the parent group for the upcoming iteration. Then at 96b the sub-group which had been the "down-group" created at 92 during the current iteration is marked as the current group for the upcoming iteration, note is taken at 96c that it had originally been a "down-group" and it is processed starting at 90.

During any iteration, if a decision at 94 is not to analyze further right, and the decision at 96 is not to analyze further down, then at 97 a check is made whether the current group has a parent group, (since the existence of the parent group means the existence of a group whose processing had been interrupted at 94 or 96). At 97a, a check is made as to whether the current group had originally been a "right-group" or a "down-group," this being a way of identifying the point at which processing of the parent group had been interrupted. If the current group had been a "right-group," its parent group (noted at 94a) is reidentified at 97b as the current group, and its processing is taken up at 96. If the current group had not been a "right-group," then it had been a "down-group." Its parent group noted at 96a is reidentified as the current group at 97c and processing of this reinstated current group continues at 97. Thus, the process of analysis having been interrupted potentially numerous times for the analysis of sub-groups and sub-sub-groups eventually completes all the interrupted analyses until eventually a parent group is reinstated as the current group, which was the original group with which the whole analysis procedure was begun. When the analysis of this group proceeds to 97, it will be found to have no parent group, and the analysis procedure terminates.

In this way every sub-group of the original group of texts is analyzed to the desired depth and a "tree" built out of the original list of texts. This tree is an analysis of the relationships among the various texts in terms of the keywords which describe them; it groups related texts together according to the similarities in their subject matter and locates all the texts in a structure of headings and sub-headings.

At each node of the tree, the list or node in the "right" direction defines the texts which belong to the largest category from the set of texts which was input to the node, and the list or node in the "down" direction defines those texts not included in that largest category. Starting at the root node (the list of texts generated by the user's original search request) and reading down from node to node, provides a listing of the major categories into which the original group of texts has been divided.

This listing is automatically sorted into "order of importance" through the above procedure of selecting the successive "criterion keys;" the larger the group of texts described by any particular criterion key, the closer it will be to the top of the list. The tree, then, provides a break-down of the original list of texts into its various subject matters, and can be extended to any described level of detail.

Control of the analysis 94, 96 is achieved either under interactive user control or automatically on the basis of the number of texts already found and displayed. In automatic mode, analysis to the "right" (that is, more detailed analysis of a group of texts which are described by the "criterion key") is terminated at 94 either when all the texts in the set have been shown, or when the depth of analysis of that set is such that further analysis would take up too much space, making it impossible to show the "down-list" within the limits which have been set for the number of lines of analysis to display. Analysis "down" (those texts which are not described by the current "criterion key") is terminated at 96 either when all texts have been shown, or on reaching a predetermined limit as to the number of lines to show.

The user may control the analysis process by setting in advance the number of display lines at which he wishes automatic analysis to stop, or interactively by at each stage in the process deciding whether to further continue analysis either "right" or "down," and how far to continue it in either direction. In addition, as specified below, the user may invoke various additional features affecting the procedure of analysis as generally illustrated in FIG. 10.

RESULTS OF THE ANALYSIS

As generally illustrated in FIG. 8, the results of the analysis procedure described above is presented to the user as a screen display, indicating the groups of texts which have been found and their relationships to each other, in the form of a "table of contents" of headings, sub-headings, and texts.

The process by which this table of contents is created is illustrated in FIG. 8. First, the description of the original search request is displayed on the screen at 98. Then the first node, or "trunk" of the tree, (being the information provided by the analysis of the first group of texts to be analyzed at 90) is reference at 100 an the keywords which describe it (the criterion key, and any other keywords which are common to all the texts of the group) are put on the screen at 102. The existence of any texts which that node completely describes (that is, texts all of whose keyword have by now appeared on the screen) is then indicated on the screen at 102 by using an arrow symbol to represent them. Non-printing codes which include the text's text-number are embedded in the table of contents at this point. These codes are used later, if the user asks to see the text whose existence is indicated by the arrow displayed. If there is at this time no right node (because the user, controlling the analysis interactively, chose not to split the group, or because a preset maximum depth of analysis had been reached), yet the group does still contain texts which have not yet been completely analyzed (i.e, texts some of whose keywords have not yet appeared on the screen), then this fact is indicated by showing the number of such texts in brackets; e.g., "(8)." In this case, non-printing codes are embedded in the table of contents giving the location in memory of information about this node/subgroup, including the list of texts belonging to it. This information is used later if the user asks to "expand" the analysis of this group's texts, or to perform some other manipulation on the texts of this group.

At 104, the program then checks if there is a "right-node" associated with the current node (such a right node will have been produced by the analysis if there is room to expand further to the right in the outline, and if there are still texts with unexamined keywords in the node). If such a "right-node" exists, the count of how far to indent the next line on the screen or printer is increased by one at 106.

At this point, the routine we are describing invokes itself recursively. The handling of the recursive process (104a,b,c) parallels that described above for 94a,b,c as the handling of 108a,b,c follows that of 96a,b,c. Indeed, the entire procedure described in FIG. 8 parallels that described in FIG. 7, with the difference that FIG. 7 describes the splitting of the groups of text into subgroups (at 90, 92), and FIG. 8 describes the display of information about each group at 102 and controls the level of indentation of the display lines at 106 and 110. Control of the return for recursive iterations at 112, 112a,b,c parallels that described above for 97, 97a,b,c.

Thus the transition from 106 to 100 in FIG. 8 is a recursive invokation of the routine being described. Without the routine having completed its activity the "right-node" is now designated as the current node to be handled 104b (the node whose processing is interrupted being referred to as the "parent-node") 104a, the level of indentation on the display is incremented 106, and the very same routine starts out "from the top" handling the current node (which had been the right-node) as if it were being invoked for the first time. Thus, the routine described in FIG. 8 invokes itself; while still in the middle of handling the root node, it calls itself to handle the right-node.

The new current node is then handled as described, including the handling of its own right and down nodes, until the process runs to completion at 112. At 112 there are unfinished nodes to be handled, at 112a this node's parent node is seen to have been a right node, at 112b it is reinstated as current node and its processing continues at 108, which is just after the point at which handling of the node had been interrupted in order to handle its right node.

Next, the program checks whether a "down-node" exists at 108. If so, it is identified as the current node (without changing the indentation), a process similar to the one just described is undertaken at 108a,b,c, and the routine invokes itself again 100. Thus, handling of the parent node is again suspended while the down-node (now the current node in the new invokation) is handled. When work on the down-node (which includes work on any of its subordinate nodes) reaches 112 and 112a, the parent node is reinstated as current node at 112c, and the level of indentation used (at 102) in creating display lines is reduced by one at 110. Since, in the example we have been running through, the node which is now the current node was the original "root" node, at 112 the display process terminates at 115.

Thus, processing of the root-node (the node first supplied by the original text search) is interrupted first to process the right-node, and then to process the down-node. Each of those processes may in turn be interrupted to process right-nodes and down-nodes, each of which may in turn be interrupted, etc.

Each time that the processing of a given node terminates (when there is no further right-node and no further down-node to be handled) the program checks at 112 if there are unfinished nodes to process. If such nodes exist, at 112a control is returned to the parent node from which the routine was invoked, and processing picks up where it left off. In the case of the root-node, there is no parent-node, and the process terminates at 115, the whole table of contents having been displayed.

Illustrated in FIG. 9 is an example of such a screen display. The first line is a heading indicating the search request which created this analysis. The remainder of the display represents, by showing the successive criterion keys as headings, the results of the analysis in the form of an organized "table of contents" of the section of the textbase under analysis.

In this "table of contents," lines ending with an arrow, such as line I.B.2, represent the presence of a text which includes only the keywords shown in that line and in the headings above it. In the case of this example, a text has been associated with the keywords "fruit,"

"oranges" and "jaffa." Analysis right on this text has been completed. If there were more than one text with these keywords, a series of right arrows would be shown on the line, one for each text.

Lines in the table of contents with a number shown in brackets, such as line I.A.1, indicate that there are that number of texts including the keywords shown in that line and in the headings above, as well as other keywords, and those texts are not shown individually in this analysis (i.e., analysis "right" has been terminated at this level).

Line I.C. above shows that there are other categories of texts not included in this table of contents (i.e., analysis "down" has been terminated at this point).

USING THE TABLE OF CONTENTS

The user can either review the texts indicated by the analysis, or ask for a further "expansion" of a group of texts which have not been fully analyzed. The user moves the cursor up and down on the screen to point at the text or group of texts he is interested in; and then presses a key to request that the text be displayed by the word processor or that the group be expanded.

If a text is to be displayed, its number is taken from the non-printing codes embedded in the table of contents. That number corresponds to an entry in the text pointer file 44, where the location of the text itself (within the text file 42) is indicated. The text is read from the text file and passed to the word processor imbedded in the text retrieval system for reading, editing, or printing.

If a group's analysis is to be expanded, the program refers to the on-printing codes embedded in the table of contents to find the location in memory of the list of texts and other information associated with the group. The information is then passed to the analysis and display routines previously described (FIGS. 7 and 8). This new analysis is presented in a new screen display, to be used in the same way as the "parent" analysis; the user can continue to "expand" any group until he finds and loads the text he is searching for, or can at any time return to a previous "parent" table of contents to look at a different group of texts.

Further information might be provided to the user by a special header which appears at the top of the screen whenever he stops moving the cursor on the table of contents; this header indicates the list of keywords describing either the text or the group of texts which that line represents. In addition, screen highlighting might be used to indicate that the cursor is pointing at a specific text, or to indicate all lines of the display which are contained in the group referred to by the cursor.

ALTERNATIVE TEXT GROUPING

The basic method described above for grouping and sub-grouping texts which are uncovered by a search is by examining the keywords associated with the retrieved texts and then using as a criterion key the keyword which is associated with the most texts. However, in some types of analysis, it is desirable to permit other types of criterion keys to be used for segregation of the texts to be presented in the outline display. For example, an option should permit the user to impose a criterion key segregation of his choice to segregate the texts by the user's criteria. For texts including numerical data, a criterion key based on a numerical comparison may be appropriate. For data in a more structured format, such as data imported from a structured data base, it may be appropriate to segregate by texts only in certain fields.

SUMMARY OF BASIC PROGRAM

Thus the basic core of the text information storage and retrieval program described so far is capable of storing as data files a series of heterogeneous texts. The texts are associated with keywords, and an index is maintained as to the texts with which each keyword is associated. When an operator performs a Boolean search by keyword for certain text files, the program, before presenting the results to the operator, analyzes the text files which were identified using the criterion key method to uncover relationships among the texts in the search results. The program then creates a visual hierarchial display, in outline form as in FIG. 9, to display the results of its analysis of the text files in the search result. The user then uses the table of contents display to proceed to locate the text of interest, either through the use of successively more detailed outlines, or by identifying a single text to be displayed.

HOT LINK

The system as described so far is capable of retrieving data and uncovering relationships only for text which have actually been created by or entered into the program. Many users, however, either prefer to create and maintain text information using a specific application program with which they are comfortable, like a word processor, or already possess a large body of texts, perhaps also generated by a word processing or data base manager program, that could be indexed and retrieved using the method described above. Therefore, to achieve this objective, the method of the present invention has been designed to enable the text information storage and retrieval program to establish a "hot link" to files created by other external software application programs, such as a word processor, spreadsheet, data base manager, or any other computer program creating files. While the external file will be referred to in this specification so that its retrieval in this text base retrieval system can be best explained, it should be understood that some external text files, for example drawing files or computer aided drafting files, might have minimal text content. Keyword information about the external text file is created and indexed in the text information storage and retrieval program. That keyword information is then used in the criterion key search, analysis and retrieval method described above. If the external text file is the file to which access is sought by the user, the text information storage and retrieval program suspends operation, leaving a program kernel resident in the computer, and then launches the external text file using the external application program. In this way a link is created from the text information storage and retrieval program to the external application program. This link is called a hot link since it operates dynamically without special need for the user to either close and terminate the text information storage and retrieval program or to open and initiate the outside application program or associated external text file manually.

The features of a preferred embodiment of this hot link feature will be discussed in the context of a particular text information storage and retrieval system now sold commercially under the trademark IZE. This program is written in C language code for the IBM-PC and compatible computers, but it is to be understood that it is readily adaptable to any other general purpose data processing computer. The general features required to support inter-program data retrieval, through hot links, will now be described first briefly, then in detail, in the context of the IZE program.

To retrieve data files, the IZE program must have a series of text in its text base to which search criteria may be applied. For a hot link to an external file, an internal text is specially created for this purpose which is called a summary text. The summary text contains certain data about the external text file and a list of keywords associated with the external text file. The parameters about the external text file stored in the summary document are used by a hot link driver routine to actually launch or operate the appropriate external application program causing it to open the external text file. Before execution control is passed to the outside application program, the IZE program saves almost all of its program code and data to disk and leaves resident in RAM memory an IZE program kernel which allows the user to mark, add, alter, or delete keywords in the text file while the external application operates. When operation of the external application program terminates, control returns to the resident IZE kernel which reloads the previously saved portion of the IZE program and data, and adds the modifications to the keywords for the external text file to its internal summary document text files.

HOT LINK DRIVER

A hot link driver is a data file of the IZE program associated with a particular external application program. For example, hot link drivers have been constructed for a number of the most popular word processing programs. Each hot link driver is intended to contain the information necessary to find, and run, a particular external application program and to open or create a text file using the external application program. A hot link driver can also be used to run programs for which no text files are associated, although this would not be the most common usage.

A hot link driver is created or modified by the user with the aid of a menu-driven driver editing program. The menu for this routine guides the user through creation of the parameters required for operation of the external application program and an external text file. The user is to specify a file name for the hot link driver file, and also a descriptive name for the hot link driver may be used to appear in menus in the IZE program. The drivers installed for all external application programs may be combined into a single conglomerate file with the individual drivers then being separately accessible.

In the implementation in the IZE program, the installed hot link drivers are stored in a single file denominated IZE.XWP. Each entry in that file, in a standard format, is the data for a given driver. The format of each entry in file IZE.XWP is as follows:

```
struct caller
{
    short namesize;/*length of the hot link
              driver name in bytes*/
    char name [ ];/*name of the driver*/
    short entrysize;/*length of the following table*/
    char table [ ];/*table of parameters*/
{;
```

The table of parameters is made up of a series of variable length records each containing three data items: an identifier for each parameter, a length for the following string, and a character string for the parameter. The order of parameters is not significant. The following is a list of the types of parameters stored in the files for the drivers.

1) The .XP_ENDTABLE parameter is to signify the end of the table.

The following parameters 2-9 are combined with the IZE user's entries when creating a new hot link text file to define the final file specification for the external text file. For each category of parameter (i.e. drive or file name), either an override or a default may be entered, but not both.

2) An override drive select parameter is used to specify the drive for the external text file. This parameter may be omitted if a user defined or the default drive is satisfactory.

3) An override path select parameter is used to specify a path to access the external text file. This may be omitted if a user defined or the default path is satisfactory.

4) An override file name parameter specifies the file name to be used for the external text file, regardless of the file name entered by the user. Again this parameter may be omitted for user-defined or default assignment.

5) An override file extension parameter is the file extension of the external text file, which again may be omitted.

6) A default drive parameter is used to specify a default drive selection for the text file. If this and the override drive parameter are omitted, the user must enter a drive select value. The same is true of the other default parameters.

7) A default path parameter provides a default path.

8) A default file name parameter provides a default file name for the external text file.

9) A default file name extension parameter provides a default file name extension for the external text file.

10) An external program run drive parameter is used to switch the default DOS drive prior to launching the external application program. This record may be omitted if the operating system default drive is satisfactory.

11) An external program run directory parameter is used to switch the default DOS directory prior to launching the application program. This record may be omitted if the then current DOS default directory is satisfactory, as for example when the launched application is on the DOS search path.

12) An external program command new file parameter is an entire command line, including the program run name, which is issued to the operating system to launch the external application program and to open a new text file using that external program. If this parameter is omitted, then the next parameter is used for this purpose.

13) An external program command open file parameter describes an entire command line, including program run name, which is issued to launch the external application program and to open an existing text file using that external program. This record is required.

14) An external program keystroke new file parameter describes the stream of characters required by the external application program to create a new external text file. This parameter may not be required for some application programs.

15) An external program keystroke open file parameter describes the stream of characters needed to cause the external application program to open an existing text file.

16) An external program word pop-up parameter defines the keystrokes which are to be used during operation of the external application program to cause the IZE kernel (described below) code to examine the video display, determine the word located at the current display cursor, and add this word to the keyword list for the external text file. If the record is not supplied, the function is unavailable. The keystroke should be chosen to be one not normally used in the external application program.

17) An external program list pop-up parameter similarly defines a keystroke which is used during operation of the external application program, which will cause the IZE kernel code to pop-up to the display the keyword list for the external text file for editing.

18) An external program memory needed record parameter is a single byte specifying the minimum number of memory blocks of RAM which the external application program requires. The IZE program invoking the hot link driver attempts to free up that amount of memory before launching the external application program; if it is unable to free up that amount of memory, an error message results.

19) An external program memory wanted parameter similarly defines the optimum rather than minimum free RAM desired for the external application program. The IZE program hot linking driver should attempt to create this amount of free memory before launching the external program.

20) A no file name parameter is used to specify if the external application program which is to be invoked has no external text file associated with it. This would be used to create a hot link to a program with no file in particular. An example of such a program might be a communication application which simply allows terminal access to a host computer.

21) An external program file conversion name parameter is used to specify a file conversion routine to apply to the external text file if the external text file is to be scanned using a keychanger when a summary document is to be first created for that external text file.

The following are a series of special indicator characters that may be imbedded in the parameter strings to specify that at time of use of the parameter, certain user or IZE program supplied data is to be inserted in the parameter string.

1) Insert file name indicator causes the file name of the external text file being opened or created to be inserted into the string during run usage.

2) Insert file name extension does the same for the extension.

3) Insert path cause the path of the external data file being opened or created to be inserted.

4) Insert drive cause the drive for the external text file to be inserted.

These insert indicator characters are replaced with values after the default and override parameters and the user-defined file information are entered, but before the remaining parameters are evaluated. All of these insert characters reflect the file specification from the hot link summary text, but not necessarily as supplied by the user. For example, if the user enters a simple file name, e.g. "FISCAL," an actual file specification displayed in the hot link summary text might be "C:/123/REPORTS/FISCAL.WK1." In this case, the insert drive name indicator is replaced by "C", the insert file extension by "WK1", the insert path by "123/REPORTS", and the insert file name by "FISCAL."

5) An insert IZE path indicator causes the path to the IZE program to be inserted into the string during run usage.

6) An insert IZE drive indicator causes insertion of the drive on which the IZE program is found.

7) An insert total file specification indicator causes the entire file specification of the external text file to be inserted. This is the equivalent of special indicator characters 1, 2, 3, and 4 combined.

8) An insert base drive indicator allows the insertion of the drive which contains the current text base into the string during run.

9) An insert base path indicator does the same for the path to the current text base.

10) An insert scan indicator is used only in parameters 14-17 above and causes the next two characters in the string to be interpreted as an ASCII code/scan code pair representing the next keystroke.

11) An insert wait-for-flush indicator character is used only within parameters 14-17 above describing keystrokes to open new or existing files and when encountered during simulation of keystroke generation, causes the program to wait until the external program being launched flushes the keyboard buffer before feeding any more characters from the keystroke definition string to the external application program.

CREATION OF SUMMARY TEXTS

In the implementation of the IZE program using external text files, a summary text is required for each such external text file. Three information items are required to build this summary text document. These items are: (1) the name of the hot link driver to connect to the external application program; (2) the name and location of the external text file to which the summary text is to be hot linked; and (3) the keywords which are associated with the external text file or the text in it.

The summary text itself is an integral text base entry in the IZE program and is generally treated as any other text as described in FIGS. 3A-3G, i.e. as a record 42a in the text base file 42. It remains in the text base and, just like any other text, it can be accessed and modified at any time.

New summary texts can be created in either of two slightly different procedures. The first is to create a new summary text for a new or proposed external text file. The alternative is to create a new summary text for an existing external text file or for an external application which uses no text files.

In the case of a new external text file, the user selects a menu item to begin the process of creating a new summary text for a specified external application program. The menu selection in the IZE program is "Create Hot Link." The summary text can be initially created without keywords, or an initial set of keywords can be assigned from another text or from an outline. The user must specify the name of the hot link driver, i.e. that driver associated with the external application program. Unless the external application program has no external text file associated with it, the user must also specify the name and location the new external text file is to have. The program then takes the user's entries and combines them with the override or default parameters in the designated hot link driver to derive a full drive, path, file name and extension for the external text file.

At this point the summary text has been created. If the user invokes the hot link, by moving the cursor to a hot link symbol on the display, the hot link driver then exercises the appropriate commands and keystrokes to leave the IZE program, launch the external application program and, if appropriate, create a new external text file using the external application program.

In the case of an existing external text file, the user again selects a menu item to establish a summary document for that external text file. In the IZE program, this menu selection is called "Hot Linked Import." The term "import" for this activity is a slight misnomer since the entire external text file is not permanently imported, but is, if at all, only temporarily imported for scanning by the keychanger to generate keywords for the summary text. The appropriate hot link driver must be specified. The user may also specify that the contents of the external text file be analyzed for the presence of certain words or structures and, if found, to automatically assign the word or structures as keywords associated with the external text file by assigning the keywords to the summary text. A user may select one or more external text files from a list of all such files on the system for which summary documents are to be created.

This process is illustrated by the flow chart of FIG. 10. The Hot Link Import option is selected at 310. The hot link driver for the external application program, referred to in the flow chart as the creator program, is selected at 312. The user is given the option to select or decline automatic keywording at 314. A keychanger for automatic keywording is implemented at 316. At 318, the external text files for import are selected which, at 320, are used to create the appropriate summary documents.

Figure 11:
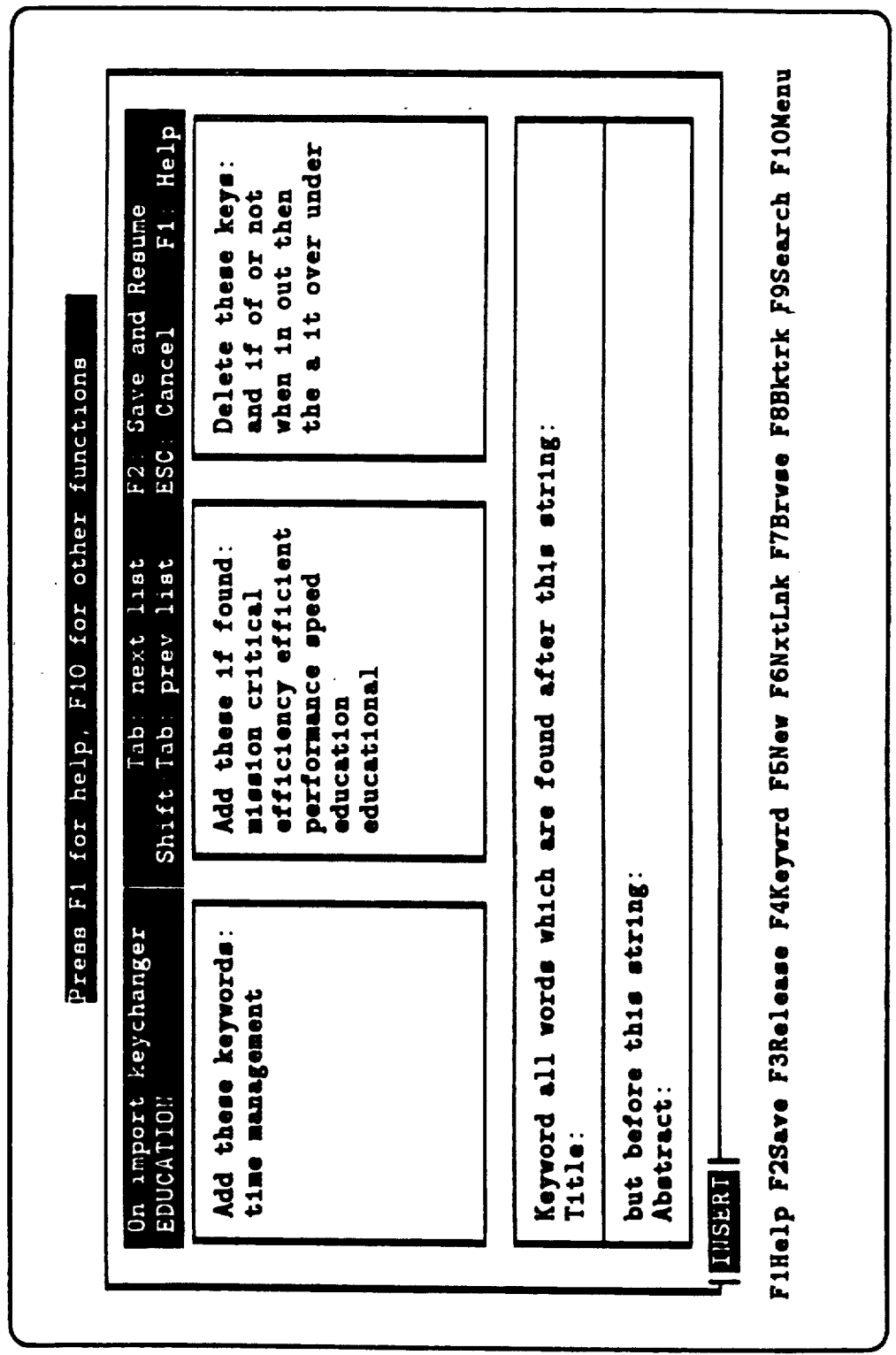
FIG. 11 is a view illustrating a sample screen display of a keychanger screen in accordance with the method of the present invention.

Illustrated in FIG. 11 is a keychanger screen display. This screen defines the keychanger process, which is, in essence, a set of automatic keywording rules for use in scanning a given import text file. Four types of rules are permitted: (1) Words which are unconditionally to be marked keywords for any text to which the keychanger is applied, regardless of whether the words actually appear in the text. These keywords appear in the "Add these keywords" box as shown in the display of FIG. 11. (2) Words may be designated to be keywords only if found in the text. These are in the "Add these if found" box in FIG. 11. (3) A pair of character strings can be designated, which if encountered in the text, initiate and terminate a series of words which will all be considered keywords. These strings are designated in the boxes "Keyword all words which are found after this string:" and "but, before this string:" as shown in FIG. 11. (4) A set of words which may never be keywords may be designated, overriding all the other rules. These are found in the "Delete these keys:" box in FIG. 11. The combination of keywording rules, set up using this display, is a single keychanger. It is possible to have many keychangers, each a unique combination of keywording rules. The user can thus either select an existing keychanger or create a new keychanger to use during a hot link import to automatically designate the initial set of keywords for each new summary text.

Figure 12:
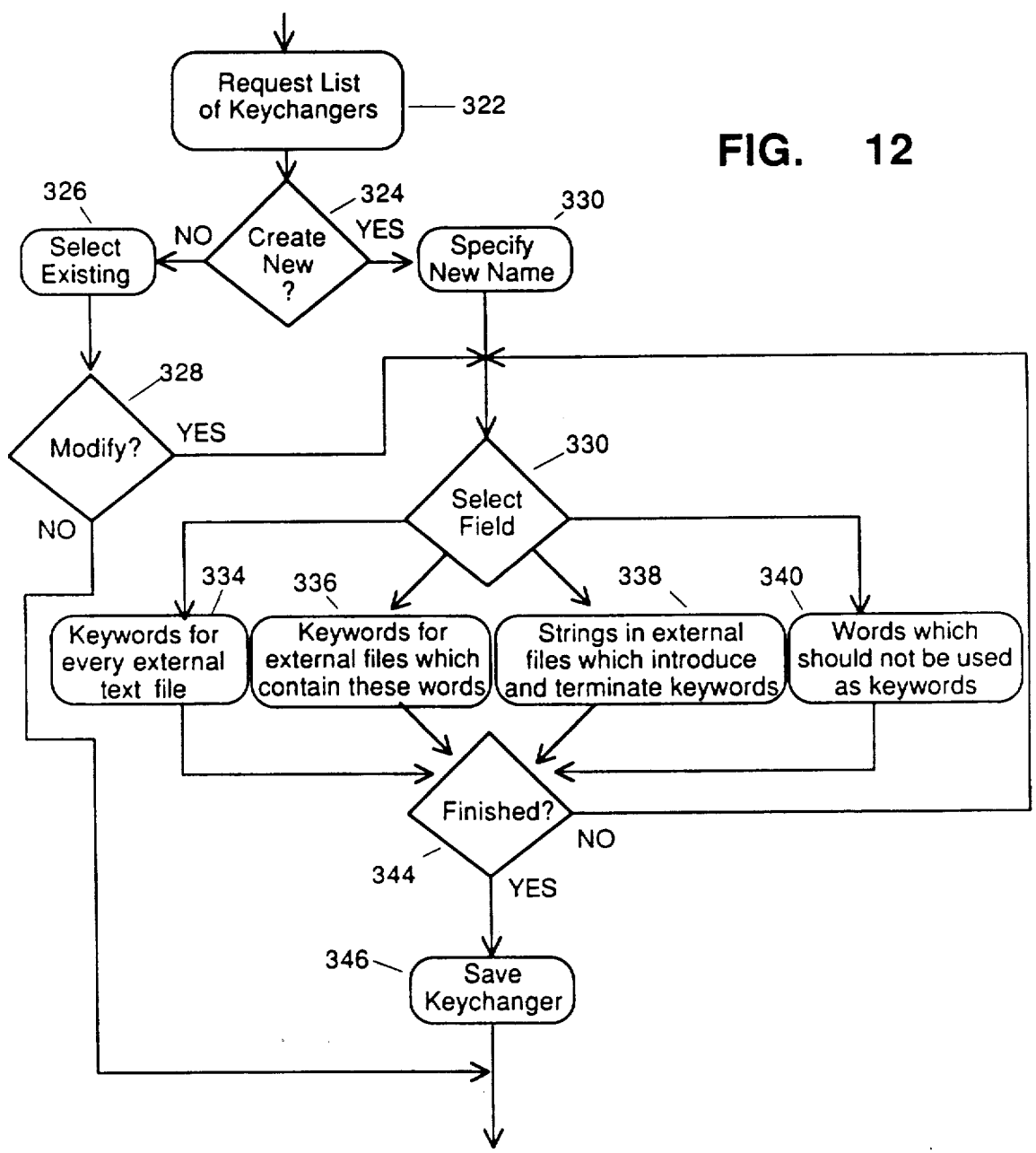
FIG. 12 is a schematic flow chart of a method of automatic creation of summary texts for a group of external text files.

Shown in FIG. 12 is the routine for implementing the keychanger, as illustrated in summary fashion by step 316 in FIG. 10. The procedure of FIG. 12 begins with a step 322 in which the user may request the list of preexisting keychangers. Note in FIG. 11 that the parameters for keywording illustrated in that figure are referred to as the keychanger "EDUCATION." A library of various keychangers can be constructed, each adapted for keyword input from a given set of text files, and these keychangers can be referred to by their titles. Thus a library of such keychangers can be created. Thus, after the user is given access to the list of keychangers at step 322, at step 324 the user is asked whether it is desired to use an old keychanger or create a new one. If an old keychanger is used, at step 326 the user selects the preexisting keychanger which it is desired to use, and then at step 328 is given the opportunity to modify that keychanger. If the user desires to use an existing keychanger without modification, the program then proceeds back to step 318 in FIG. 10. If the user is creating a new keychanger, at step 330 the user is prompted to specify the new name for the keychanger. Then, regardless of whether the keychanger is new, or is a modification of an existing keychanger, the user is given the display screen of the form illustrated in FIG. 11 from which the user may select fields at step 332 for editing, modification, or entry of new keywording data. Illustrated at step 334 is the box for adding keywords to be applied to every external file imported with this keychanger, or the prompt "add these keywords:" from the screen at FIG. 11. At step 336 is indicated the method step which uses the "add these if found:" box from the screen display of FIG. 11. At step 338 is indicated the step for beginning and terminating strings in which all words are determined to be keywords. At step 340 is represented the "delete these keys:" box in the screen display of FIG. 11.

At any point during the edit operation, the user may indicate that the create and/or edit keychanger process is finished as indicated at method step 344, which is accomplished by a save and resume instruction, utilizing a special function key, in the screen display of FIG. 11. This terminate editing command is indicated at step 344 and the save instruction is indicated at method step 346 in FIG. 12. After the keychanger is thus modified or selected, program operation proceeds to step 318 as illustrated in FIG. 10.

Illustrated in FIG. 13 are further details of the method step illustrated at 320 in the flow chart of FIG. 10. This process, is the one for the automatic creation of summary texts for all the selected external text files which are to be imported during a create-hot-link procedure. At method step 350 the procedure inquires if a keychanger has been selected. If a keychanger has been selected, the program proceeds to question at method step 352 whether file conversion is necessary. Whether or not a file conversion is necessary, and the identification of the appropriate file conversion routine, is determined by the parameter in the hot link driver. If file conversion is necessary, as tested at step 352, then the program implements, at step 354 a conversion utility to convert the external text file into ASCII format for scanning during this import procedure. If a keychanger has not been selected at method step 350, if file conversion is not necessary as indicated at method step 352, or if a conversion has been performed at method step 354, program operation then passes to step 356 where a parameter is set equal to the number of external text files for which summary texts are to be created. At method step 358 a summary text is created for each external text file. The summary text includes the name of the external text file, its location, and the name of the hot link driver. The summary text is also given the current date stamp and the current time stamp of the external text file. This time and date data is stored with the summary text and is of some importance. If the user seeks to hot link to an external text file when it has been altered since the last time that the external text file was accessed by the hot link from this program, as indicated by a new date or time stamp, a flag will be given to the user warning him of the possible change in the external text file. It is the storage of the date and time stamp information at this point in the process that allows such a warning to be given.

At method step 360 the "add keyword" routine in the keychanger proceeds to add as keywords for the new summary text all the keywords indicated in the "add those keywords:" box on the keychanger screen. The keywords are handled within the structure of the information storage and retrieval program, as illustrated in the file structure FIGS. 3A-3G, in the same fashion as if the external text file was actually contained within an internal text generated by the program, with the sole exception that the actual external text itself is not imported. The summary text document serves as the internal text for the program.

At method step 362, the program proceeds to add those keywords to the summary text which indicated are to be added as keywords if found in the external text file. This corresponds to the "add these if found:" box on the keychanger screen of FIG. 11. The program would at this point scan the text of the external text file or the corresponding temporary ASCII format file created earlier at step 354, to determine if the keywords are found in the external text file. Those keywords that are found are associated as keywords with the summary text, as if the entire external text file was contained within an internal text created by the program. At step 364, a search is conducted for the string in the box "keyword all words which are found after this string:" box in the display screen of FIG. 11. If the string is found, the program reads the words which follow the beginning of the string at step 366, and then, after each such word is found, proceeds to test for the keyword termination string at step 368. The termination string is the string appearing in the "but, before the string:" box in display of FIG. 11. Until the keyword termination string is found, the program proceeds after each word to step 370 which adds the word as a keyword to the summary text. This sequence of method steps assures that all words between the introduction and the termination string are added as keywords associated with the summary text. When the keyword termination string is found, or if the end of the text is reached, or if no keyword introduction string is used, the program proceeds to step 372 in which the "Delete these keys:" instruction box is followed to delete from the keywords created for the summary text those keywords which have been forbidden as keywords. By method steps 374 and 376, the program tests, in essence, whether or not it has created a summary text yet for all of the external texts files for which it has been instructed to do so. If the program has not yet completed all the files, then the program branches at 376 to repeat the create-summary-text routine of steps 358 through 372. If all the summary texts have been created, the routine terminates operation and returns control to the user with prompt for further operation.

ACCESSING THE HOT LINK

Shown in FIG. 14 is the screen display for a summary text. The display includes the name of the external application program, i.e. the "Creator Program," the name of the external text file, and the keystrokes to be used, when the external application program is operating, to tell the IZE kernel program to mark a keyword or to pop-up a keyword list for the user to edit. A narrative text may be entered. Next to the prompt of "Access external file" is a diamond symbol. By placing the cursor on that symbol and pressing the "enter" key, the user exercises the hot link to leave the IZE program and launch the external application program.

Figure 15:
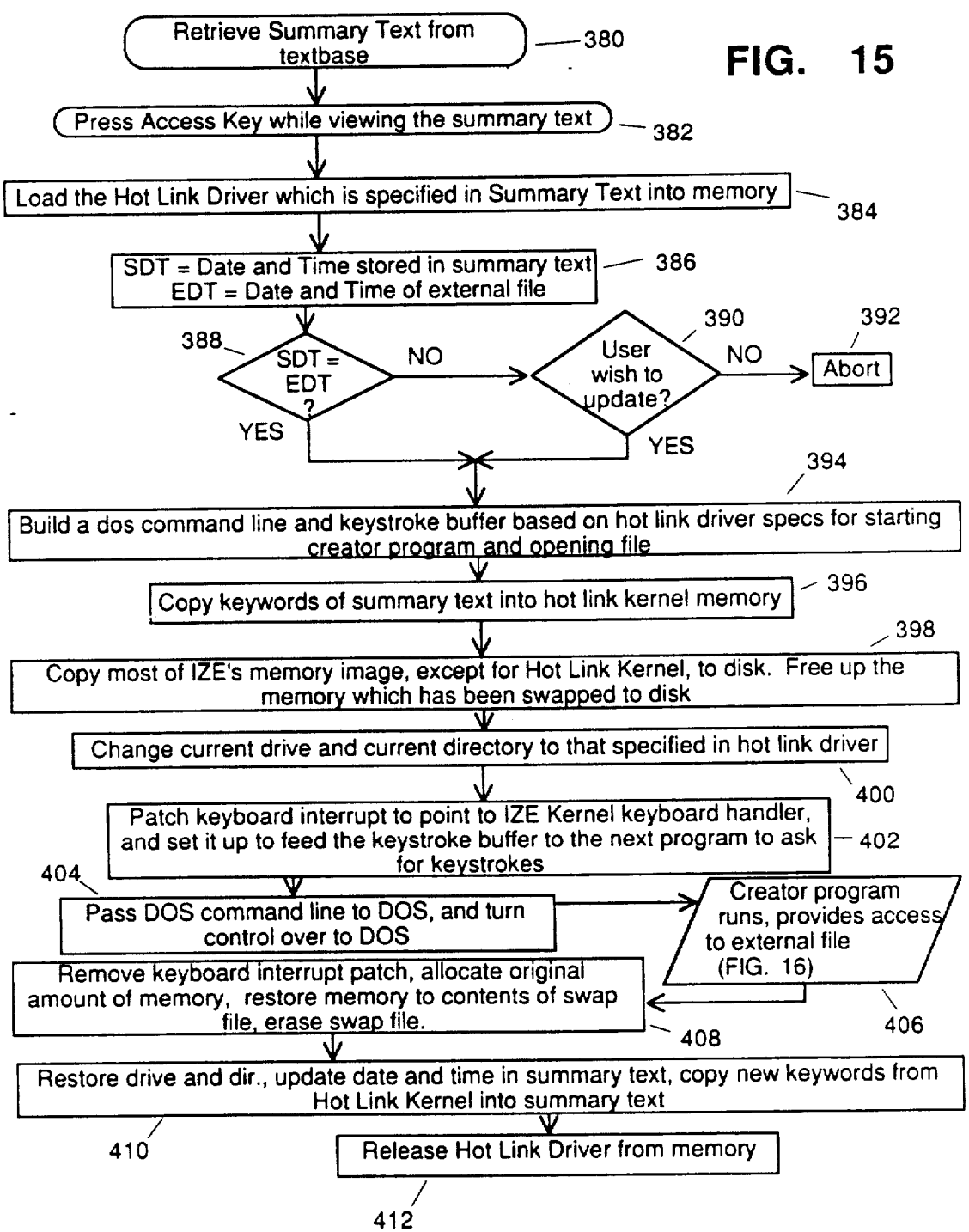
FIG. 15 is a schematic flow chart of a method of hot linking from a summary document to its external text file.

Illustrated in FIG. 15 is the method to actually perform the hot link to the external text file. Indicated at method step 380 is the process of retrieving the summary text from the text base using the standard IZE program methods. This standard method of retrieval refers to the search, grouping, display, and access procedures described with reference to FIGS. 6-9 above. As usual, a keyword search is conducted, a group of texts is identified, and the keywords in those texts are analyzed to create an outline similar to FIG. 9. The user selects from the outline the item, or text, that the user wishes to view. If the text happens to be a summary text for an external text file, the user is presented the screen display of FIG. 14, indicating that the actual text is an external text file which can be accessed through the hot link. It is this procedure that is summarized by method step 380. The actual access of the hot link, which is indicated in the flow chart at method step 382, is the process of locating the cursor on the diamond symbol on the display of FIG. 14, and pressing the "enter" key, to thereby initiate the process of access to the external text file through the hot link. Once the user has selected, at step 382, to begin the hot link to the external text file, the program proceeds to method step 384 in which the hot link driver which is specified by the summary text is loaded into the memory of the computer. Recall that each summary document must have specified a hot link driver for the particular external application program while the summary text specifies the external text file which it is desired to access. If a hot link driver for the external application program cannot be located, the program cannot proceed, and an error message is displayed to the user.

Assuming that the hot link driver is located, the program proceeds to step 386 in which the date and time stored in the summary text, representing the last modification through the hot link to the external text file, and the current time and date stamp of the external text file, which indicates the last modification of any kind to that text file, are both retrieved. At step 388, the two time and date stamps are compared to determine if the external data file has been modified by another route since the last time that the external text file was modified through this hot link. If the two time stamps are not equal, indicating that modification has been made to the external text file through another route, the program proceeds to the user prompt at step 390 to inquire whether the user wishes to update or not. If not, the hot link procedure aborts at 392. If the date stamps are equal, or the user wishes to proceed, the program proceeds to step 394.

At step 394, the program proceeds to build a command line sequence of characters, and a keystroke buffer, based on the specifications which had been previously loaded into the hot link driver. These specifications are the parameters and the character strings which are custom built into each hot link driver and which are specifically adapted for launching, or starting, the "creator program," which is the external application program, and for specifically opening the external text file associated with that creator program. At step 394, these parameters and characters are fetched, and the command lines and keystroke buffers are built, but not yet utilized. The command line is that which will be necessary to invoke the creator program, i.e. the external application program, when it is desired to initiate it. The keystrokes are those which will be necessary to feed to the external application program when it is desired to operate that program and open the external text file, if any.

At step 396, the keywords of the current summary text are copied into a kernel memory portion which is to remain resident during suspension of the IZE program from which the hot link is emanating. At step 398, the current operating IZE program, except for the hot link kernel, is copied from RAM memory in the computer and is stored to disk. The purpose of step 398 to free up memory for the external application program which is about to be loaded and launched. The remaining hot link kernel remains resident in a portion of RAM memory, and survives the launching of the external application program. At step 400, the operating system is instructed to change its current drive and directory from the ones appropriate for the IZE program to that specified in the hot link driver for the external application program. At step 402, a patch is inserted in the keyboard interrupt to point to the kernel of the IZE program which is remaining resident in memory. This interrupt hook is inserted so that the keystroke requests from the external application program pass through the IZE kernel so that actual keystrokes by the user can be monitored by the IZE kernel. It is this interception of the keyboard input that allows the IZE kernel to simulate keystrokes to the external application program as well as allowing the IZE kernel to add keywords or to be popped-up during operation of the external application program. At step 404, the program passes the command line to the operating system to implement the operation of the external application program. Indicated at method step 406 is the operation of the external application program to access the external text file. The user then operates in the external application program, also referred to here as the creator program, with access to the external text file, using all the normal routines, methods and keys appropriate to the external application program. When the user exits from the external application program, after doing the work desired, the operating system returns program control to the IZE kernel. At method step 408, the IZE kernel removes the keyboard patch, reallocates the original mount of memory, and restores to the RAM memory the IZE program before it was stored. At method step 410 the drive and directory information is restored to that appropriate for the IZE program, the time and date information in the summary text for the external text file is updated, and the new keywords which were retained in the hot link kernel are imported into the summary text. At program step 412, the hot link driver is released from memory since it is no longer required. Thus, at the termination of the program steps illustrated in FIG. 15, the hot link to the external application program has been completed, and program operation is returned to the IZE program.

Figure 16:
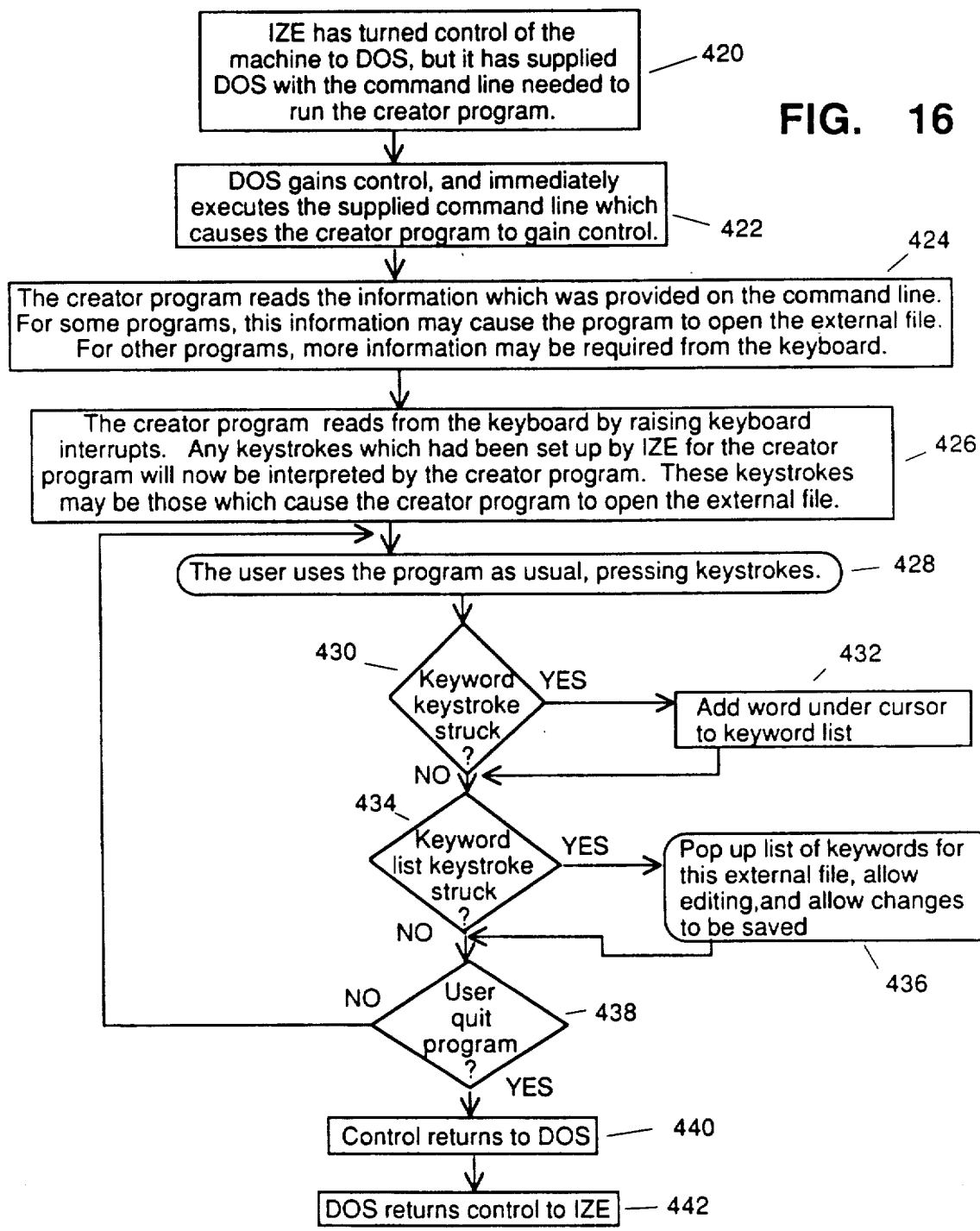
FIG. 16 is a schematic flow chart of a method of accessing the external text file using the creator program.

Illustrated in FIG. 16 are the details of operation of operating the external application program as indicated by method step 406 in FIG. 15. Beginning at step 420, the control over the computer has been transferred to the operating system (DOS), but the IZE program has supplied to the operating system a command line to run the external application program. The operating system gains control, as indicated at method step 422, and then promptly executes the supplied command line which causes the external application program, referred to as the creator program, to be loaded and gain control of the computer. The creator program, at step 424, reads the information which is supplied to it from the command line originated in the IZE program and passed through the operating system. For some external application programs, this information will cause the creator program to open an appropriate external text file. For other external application programs, the program may require information to be inputed from the user at this point in order to gain access to the appropriate desired external text file. At program step 426, the creator program proceeds to operate by reading keystrokes entered by the user and proceeding to operate in its normal fashion. Any keystrokes which had been previously set up by the IZE program, through the use of the keystroke strings loaded with the hot links driver, are now interpreted and acted on by the creator program just as if they had been typed by the user. These keystrokes may typically be those which cause the external application program to open the appropriate external text file to begin operation thereon. Indicated at method step 428 is the general procedure of proceeding to operate the external application program as usual, utilizing keystrokes and manipulating the program and its data in the fashion appropriate for that particular program. Indicated at step 430 is the continuing test, conducted by the IZE kernel remaining resident in memory, which is patched into the keyboard interrupt to interrogate as to whether one of the keystrokes which have been previously designated in the hot links driver for keyword operation is struck. If the keyword keystroke is struck by the user, at method step 432, the word under the current cursor in the external application program is immediately designated a keyword and added to the keyword list maintained by the IZE kernel resident in memory. If, as indicated at step 434, the keyword list keystroke is struck, the IZE kernel then proceeds to pop-up on the user's display, as indicated at step 436, the list of keywords appropriate for this external text file. The pop-up list utility allows for the editing and alteration of the keywords on the keyword list associated with the particular external text file. The pop-up list is edited and altered as appropriate, after which it is removed from the video display and execution of the creator program then proceeds as usual. When the user quits the external application program, as indicated at step 438, control of the machine returns to the operating system as indicated at step 440. At this point, the IZE resident kernel then is once again given control, as indicated at step 442, and reloads the copy of the previous version of the IZE program, which had been saved to disk, back into memory.

Thus, in summary fashion, if a hot link to an external application program to access an external text file is to be launched, as indicated by a user input on the screen indicated in FIG. 15, the IZE program uses the hot link driver to determine how it is going to access the external application program. It then makes a complete copy of itself, as currently found in memory, and stores that copy to disk, while a small IZE kernel is implemented to stay resident in RAM. Memory is then freed, and the external application program is loaded and operated. When the external program is completed, the IZE kernel regains control and reloads the entire copy of the IZE program which had been saved on disk back into the memory to restart operation of the IZE program exactly where it left. The only change which is made to the IZE program is at step 410 where changes which had been made to the keyword list associated with the summary text, which were stored in the IZE kernel resident during operation of the external program.

Figure 17:
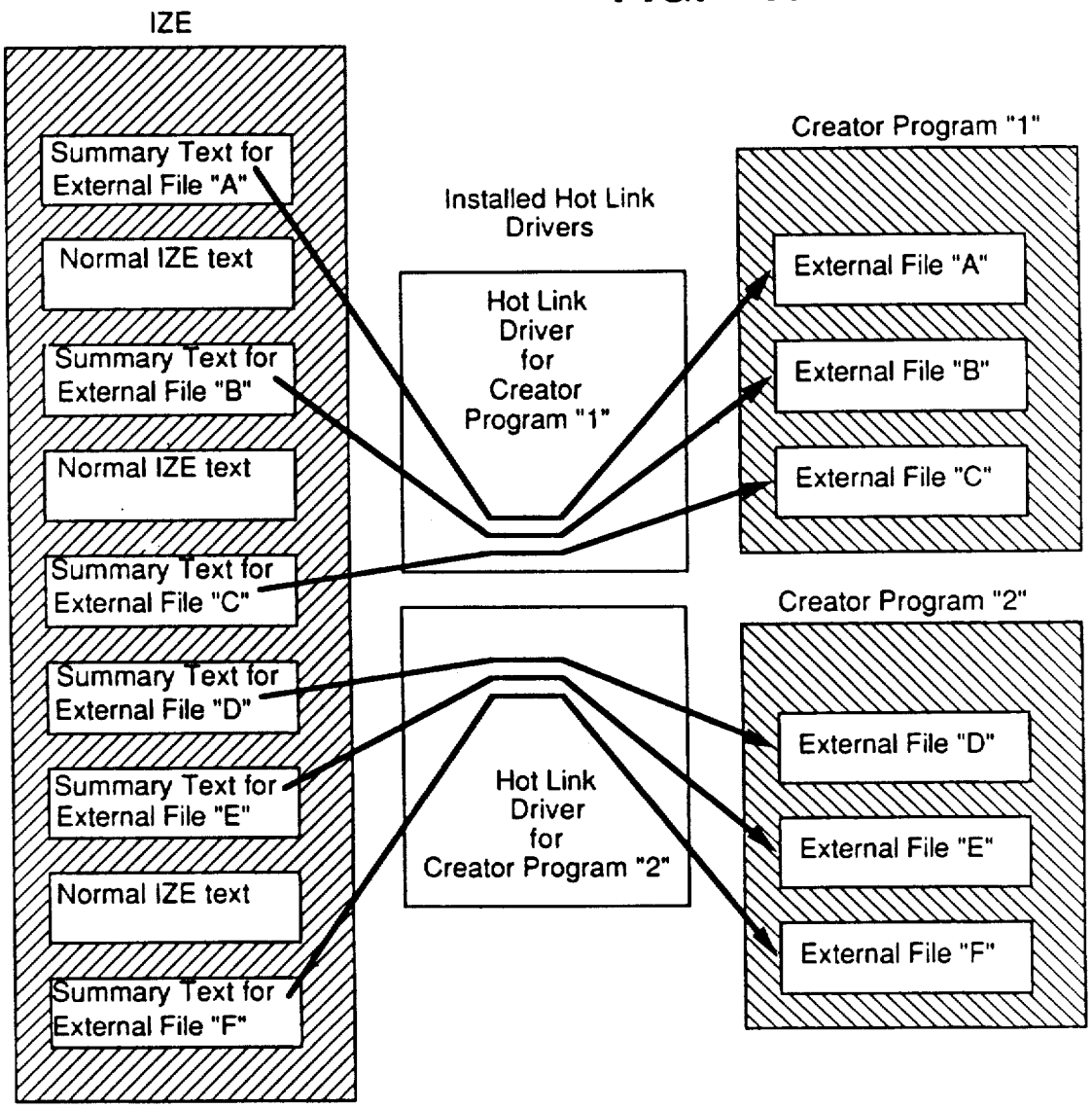
FIG. 17 is a schematic diagram illustrating the overall relationship between a program according to the present invention and the external text files.

Reference may now be had to FIG. 17 which shows a schematic illustration of the generalized operation of the entire interprogram text retrieval system implemented in accordance with the present invention. The text storage and retrieval program, such as the IZE program illustrated in FIG. 17, contains a series of texts. Some of the texts are "normal" texts created by the IZE program, and the data string of those texts are contained in a text base file created by and maintained by the IZE program. Other texts within the text base are summary texts which actually represent external text files. The user utilizes the IZE program to conduct searches, typically by keyword searches, amongst the texts contained in the text base. The keywords for all the texts, whether internal or external, are analyzed in the method described with reference to FIGS. 6 through 9 above and an outline is created. The user scans the outline, and may or may not request additional detail in any outline item. When the user arrives at the text that he wishes access to, if it is a "normal" IZE text, the text is displayed for the user. If the user reaches a summary text associated with a given external text file, the user is presented with a summary text screen as illustrated by FIG. 14. The user may then access the external file through this hot link. As illustrated schematically in FIG. 17, this hot link consists of calling the hot link driver for the appropriate creator program and accessing the appropriate external text file. As further illustrated, there is a different hot link driver for each specific external application or creator program. When operation of the external application program ceases, control of the computer reverts back to the IZE program.

In this way, a very flexible system for storage, analyzing, and retrieving texts from a whole host of external application programs is enabled. The intelligent and helpful way in which the keyword search and analysis scheme, illustrated in FIGS. 6 through 9, helps the user gain access to particular files in which he has interest can be utilized not only to access data contained in texts created within that program, but also to access data contained in any text files created by any external application program used by the user on that computer. Thus the search and outline strategy utilizing the criterion key feature can be used to analyze a potentially very large body of data or files contained on any of a number of application programs. In this way an information storage and retrieval environment is created capable of utilizing, analyzing, and accessing large amounts of data of all kinds in a swift, efficient, and intelligent fashion.

It is to be understood that the invention is not limited to the particular embodiment illustrated herein, but embraces all such modified forms thereof, as come within the scope of the following claims.

We claim:

1. A computer program method utilizing a computer processor and connected memory means for retrieving information stored in a text base of texts wherein some of the texts are internal texts created by the program and others of the texts are external text files created by an external application program, the method comprising the steps, performed by the computer processor, of
   a) building a list of keywords from the texts and indexing an association of those keywords with the internal texts;
   b) creating, for each external text file, an internal text which is a summary text, the summary text including a list of keywords having an association with both the summary text and the external text file;
   c) searching among the internal texts in the text base for those internal texts having a user-defined relationship to at least one keyword until a particular text of interest is identified;
   d) if the identified text is an internal text which is not a summary text, displaying the internal text; and
   e) if the identified text is a summary text for an external text file, suspending operation of the program and initiating operation of the external application program which created the external text file to gain access to the external text file.

2. In a computer program for storage and retrieval of texts in an internal text base in which texts are located by search operations based on keyword associations, a method for importing information into the program to provide a capability to retrieve information in an external text file created by an external application program so that the external text file may also be retrieved, the method comprising the steps, performed by a computer, of
   a) creating driver means for storing and using parameters and character strings to initiate operation of the external application program to access the external text file;
   b) creating in the internal text base a summary text including information as to identification and location of the external text file and identification of the external application program;
   c) creating keyword associations between keywords related to information in the external text file and the summary text;
   d) performing a keyword search for retrieval of texts from the text base resulting in retrieval of the summary text; and
   e) if, after retrieval of the summary text, access to the external text file is desired, suspending operation of the program, and invoking the driver to cause initiation of the external application program using the stored parameters and strings to access the external text file.

3. In a first computer program using a processor and connected memory to store and retrieve information from an information base based on information searches, a method of accessing and retrieving information in an external file created by a second external application program, the method comprising the steps, performed by the processor, of
   a) creating in the first program a summary text based on information from the external file and containing information about content and location of the external file;
   b) searching the information base for desired information to identify a search result;
   c) if the search result is the summary text, suspending operation of the first program except for a program kernel from the first program and initiating the operation of the external application program to access the external file;

d) the program kernel, while the external application program is operating, monitoring the operation of the external application program to gather information about the contents of the external file; and e) after operation of the external application program, the program kernel adding into the summary text the information gathered about the external file.

* * * * *